Aug. 6, 1963    H. C. DAVIS ETAL    3,100,112

DOCUMENT FEED MECHANISM

Filed Dec. 23, 1960    17 Sheets-Sheet 1

INVENTORS.
HOWARD C. DAVIS
ROGER H. EICHORN
FRAZER D. PUNNETT
HAROLD E. TRUMBULL
JOHN W. WAGNER

BY [signature]

ATTORNEY

Aug. 6, 1963 H. C. DAVIS ETAL 3,100,112

DOCUMENT FEED MECHANISM

Filed Dec. 23, 1960 17 Sheets-Sheet 2

INVENTORS.
HOWARD C. DAVIS
ROGER H. EICHORN
FRAZER D. PUNNETT
HAROLD E. TRUMBULL
JOHN W. WAGNER
BY [signature]
ATTORNEY Aug. 6, 1963 H. C. DAVIS ETAL 3,100,112

DOCUMENT FEED MECHANISM

Filed Dec. 23, 1960 17 Sheets-Sheet 3

INVENTORS.
HOWARD C. DAVIS
ROGER H. EICHORN
FRAZER D. PUNNETT
HAROLD E. TRUMBULL
JOHN W. WAGNER

BY [signature]
ATTORNEY

Aug. 6, 1963 H. C. DAVIS ETAL 3,100,112

DOCUMENT FEED MECHANISM

Filed Dec. 23, 1960 17 Sheets-Sheet 4

INVENTORS.
HOWARD C. DAVIS
ROGER H. EICHORN
FRAZER D. PUNNETT
HAROLD E. TRUMBULL
JOHN W. WAGNER

BY [signature]
ATTORNEYS

DOCUMENT FEED MECHANISM

Filed Dec. 23, 1960

INVENTORS.
HOWARD C. DAVIS
ROGER H. EICHORN
FRAZER D. PUNNETT
HAROLD E. TRUMBULL
JOHN W. WAGNER

BY [signature]

ATTORNEY

INVENTORS,
HOWARD C. DAVIS
ROGER H. EICHORN
FRAZER D. PUNNETT
HAROLD E. TRUMBULL
JOHN W. WAGNER
BY
ATTORNEY

INVENTORS.
HOWARD C. DAVIS
ROGER H. EICHORN
FRAZER D. PUNNETT
HAROLD E. TRUMBULL
JOHN W. WAGNER
BY
ATTORNEY

INVENTORS.
HOWARD C. DAVIS
ROGER H. EICHORN
FRAZER D. PUNNETT
HAROLD E. TRUMBULL
JOHN W. WAGNER
BY [signature]
ATTORNEY INVENTORS.
HOWARD C. DAVIS
ROGER H. EICHORN
FRAZER D. PUNNETT
HAROLD E. TRUMBULL
JOHN W. WAGNER BY [signature]
ATTORNEY Aug. 6, 1963 H. C. DAVIS ETAL 3,100,112

DOCUMENT FEED MECHANISM

Filed Dec. 23, 1960 17 Sheets-Sheet 10

INVENTORS.
HOWARD C. DAVIS
ROGER H. EICHORN
FRAZER D. PUNNETT
HAROLD E. TRUMBULL
JOHN W. WAGNER

BY

ATTORNEY

Aug. 6, 1963 H. C. DAVIS ETAL 3,100,112

DOCUMENT FEED MECHANISM

Filed Dec. 23, 1960 17 Sheets-Sheet 11

INVENTORS.
HOWARD C. DAVIS
ROGER H. EICHORN
FRAZER D. PUNNETT
HAROLD E. TRUMBULL
JOHN W. WAGNER

BY [signature]

ATTORNEY

INVENTORS.
HOWARD C. DAVIS
ROGER H. EICHORN
FRAZER D. PUNNETT
HAROLD E. TRUMBULL
JOHN W. WAGNER
BY [signature]
ATTORNEY Aug. 6, 1963 H. C. DAVIS ETAL 3,100,112

DOCUMENT FEED MECHANISM

Filed Dec. 23, 1960 17 Sheets-Sheet 13

INVENTORS.
HOWARD C. DAVIS
ROGER H. EICHORN
FRAZER D. PUNNETT
HAROLD E. TRUMBULL
JOHN W. WAGNER

BY

ATTORNEY

Aug. 6, 1963 H. C. DAVIS ETAL 3,100,112

DOCUMENT FEED MECHANISM

Filed Dec. 23, 1960 17 Sheets-Sheet 14

INVENTORS.
HOWARD C. DAVIS
ROGER H. EICHORN
FRAZER D. PUNNETT
HAROLD E. TRUMBULL
JOHN W. WAGNER

BY [signature]

ATTORNEY

INVENTORS.
HOWARD C. DAVIS,
ROGER H. EICHORN
FRAZER D. PUNNETT
HAROLD E. TRUMBULL
JOHN W. WAGNER
BY [signature]
ATTORNEY INVENTORS.
HOWARD C. DAVIS
ROGER H. EICHORN
FRAZER D. PUNNETT
HAROLD E. TRUMBULL
JOHN W. WAGNER
BY
ATTORNEY Aug. 6, 1963 H. C. DAVIS ETAL 3,100,112

DOCUMENT FEED MECHANISM

Filed Dec. 23, 1960 17 Sheets-Sheet 17

INVENTORS.
HOWARD C. DAVIS
ROGER H. EICHORN
FRAZER D. PUNNETT
HAROLD E. TRUMBULL
JOHN W. WAGNER

BY [signature]

ATTORNEY

United States Patent Office 3,100,112

Patented Aug. 6, 1963

3,100,112

DOCUMENT FEED MECHANISM

Howard C. Davis, Columbus, Ohio, Roger H. Eichorn, Webster, N.Y., Frazer D. Punnett, Worthington, and Harold E. Trumbull, Columbus, Ohio, and John W. Wagner, Penfield, N.Y., assignors, by direct and mesne assignments, to Xerox Corporation, a corporation of New York Filed Dec. 23, 1960, Ser. No. 77,953
8 Claims. (Cl. 271—53)

This invention relates to a xerographic reproducing apparatus and, in particular, to a document feed mechanism for transporting a document or original to be reproduced.

Specifically, the invention relates to an improved document feed mechanism including a copy drum having clamping means or grippers by which a document may be releasably secured on the copy drum so as to be carried around thereby and so as to be released from the copy drum when desired, and a document registration and holding device adapted to facilitate the registration and loading of documents onto the copy drum.

Both in the printing art and in the document reproducing art, various devices have been designed and constructed by means of which thin flexible sheets, such as documents or sheets of paper, are carried in a circular path by means of a blanket cylinder, or copy drum. Also in these machines, various devices have been used to permit the releasable securing of a flexible sheet onto the drum or cylinder and to permit the release of these sheets from the drum or cylinder when desired.

In these prior art devices, wherein a document or other sheet material is carried by a copy drum or cylinder, the document, which is usually presented manually to the machine had to be held in a loading position until the very instant that it is picked up by the grippers on the copy drum. However, since the copy drum is usually positioned within the machine, out of sight of the operator, it is difficult for the operator to judge when to release the document to the copy drum. If the operator releases the document too soon it may not be gripped in proper registration on the copy drum, whereas if the operator holds onto the document too long, the document may be pulled from the copy drum and torn in the process.

It is, therefore, the principal object of this invention to improve document feed mechanism whereby a document may be releasably secured in position on a rotating copy drum so as to be carried around thereby and so as to be readily releasable from the drum when desired without the necessity of stopping the copy drum.

Another object of this invention is to improve registration and holding devices to provide accurate and safe feeding of documents or other sheet material to a copy drum or cylinder conveyor.

A still further object of the invention is to provide for the locating and holding of a document in a loading position for attachment to a copy drum or other cylindrical conveyor and wherein the document is released to the copy drum or cylindrical conveyor by action of the copy drum or the cylindrical conveyor.

For a better understanding of the invention as well as other objects and further features thereof, reference is had to the following detailed description of the invention to be read in connection with the accompanying drawings, wherein.

Figure 1:
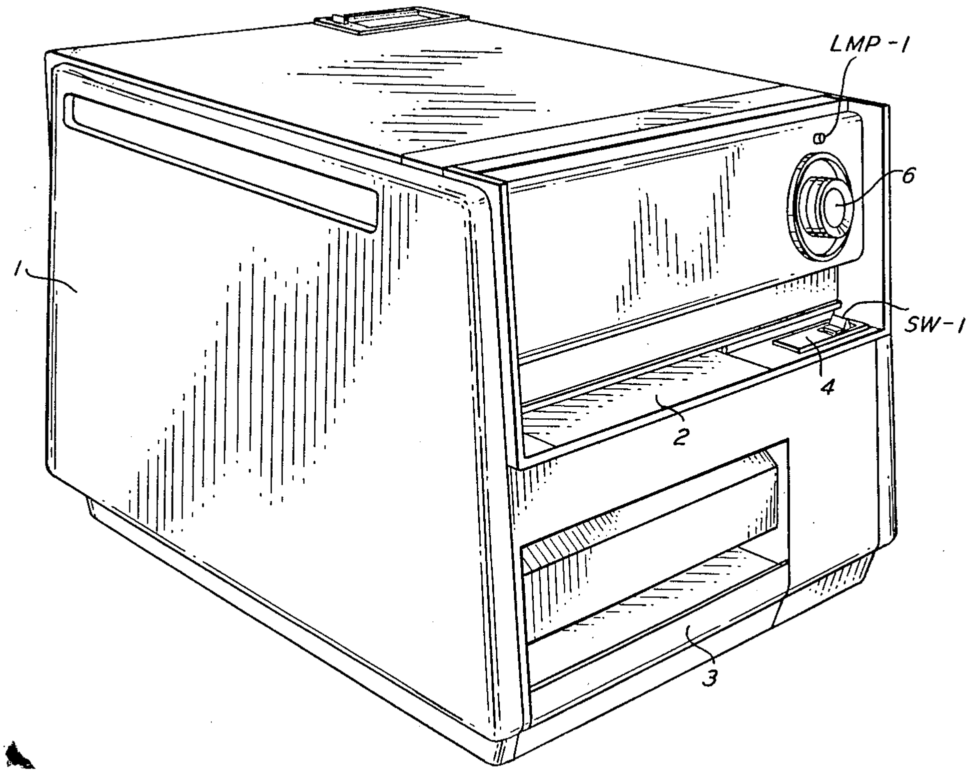
FIG. 1 is a left-hand perspective view of the apparatus of the invention.

Referring now to the drawings, there is shown in FIG. 1 a xerographic reproducing apparatus used for producing xerographic reproductions from a moving original.

The xerographic reproducing apparatus is adapted for installation within a suitable light-tight housing or cabinet of a size so that the entire unit may be mounted on an office desk or table.

*General*

As shown, the xerographic apparatus comprises a xerographic plate including a photoconductive layer or light-receiving surface on a conductive backing and formed in the shape of a drum, generally designated by numeral 20, which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is first charged and then brushed to remove residual toner particles remaining thereon after image transfer, and at which the drum surface is exposed to a relatively bright light source to effect substantially complete discharge of any residual electrostatic charge remaining thereon.

The charging station is prefrably located as indicated by reference character A in the schematic illustration of the apparatus. In general, the charging apparatus or corona charging device 21 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project a line copy image onto the surface of the photoconductive xerographic drum from a suitable original.

The optical scanning or projection assembly consists of a copyboard in the shape of a drum, hereinafter referred to as copy drum 22, which is adapted to support copy to be reproduced and arranged to rotate in light-projection relation to the moving light-receiving surface of the xerographic plate. Uniform lighting is provided by suitable lamps attached to a slotted light reflector 23 mounted adjacent to the copy drum.

A light shield 24 adapted to protect the xerographic plate from extraneous light is positioned adjacent to the surface of the xerographic plate. A slot aperture 25 in the light shield extends transversely to the path of movement of the light-receiving surface of the xerographic drum 20 to permit reflected rays from the copy drum to be directed against a limited transverse area of the light-receiving surface as it passes therebeneath.

To enable the optical system to be enclosed within a relatively small cabinet, a folded optical system including an object mirror 26, a lens 27, and an image mirror 28 is used in the preferred embodiment of the apparatus.

Copy fed through paper guides 31 to the copy drum is removably secured thereon by a suitable gripper mechanism for movement therewith in timed relation to the movement of the xerographic drum whereby a flowing image of the copy is projected onto the xerographic drum. The copy is held against the surface of the copy drum by means of guides 32 and 33, the latter also preventing the trailing edge of the copy from contacting the web cleaner 54. After the copy is scanned it can be released from the copy drum to be transported out of the machine by copy feed out roller 34 coacting with the peripheral surface of the copy drum to forward the copy through copy guide 30.

Adjacent to the exposure station is a developing station C in which there is positioned a developer apparatus 35 including a developer housing having a lower or sump portion for accumulating developer material 36. Mounted within the developer housing is a motor driven bucket-type conveyor used to carry the developer material previously supplied to the developer housing to the upper portion of the developer housing from where the developer material is cascaded over a hopper chute onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the deveolper housing. Toner particles consumed during the developing operation to form the xerographic powder images are replenished by a toner dispenser 37, of the type disclosed in copending applications, Serial No. 77,955, filed concurrently herewith on December 23, 1960, in the name of Roger H. Eichorn and William G. Lewis, and Serial No. 77,954, filed December 23, 1960, in the name of Roger H. Eichorn and William G. Lewis, mounted within the developer housing.

Positioned next adjacent to the developing station is the image transfer station D which includes suitable sheet feeding mechanism adapted to feed sheets of paper successively to the xerographic drum in coordination with the presentation of the developed image on the drum at the transfer station. The sheet feeding mechanism includes a sheet source such as tray 41 for a plurality of sheets of a suitable support material, that is, sheets of paper or the like, a separator roller 42 adapted to feed the top sheet of the stack of support material to a sheet conveyor mechanism 43 having paper grippers 44 thereon which carry the sheet support material into contact with the rotating xerographic drum in coordination with the appearance of a developed image at the transfer station.

The transfer of the xerographic powder image from the drum surface to the support material is effected by means of a corona transfer device 45 that is located at or immediately after the point of contact between the support material and the rotating xerographic drum. The corona transfer device 45 is substantially similar to the corona discharge device that is employed at the charging station in that it also includes an array of one or more corona discharge electrodes that are energized from a suitable high potential source and extend transversely across the drum surface and are substantially enclosed with a shielding member. In operation, the electrostatic field created by the corona transfer device is effective to tack the transfer material electrostatically to the drum surface and simultaneously with the tacking action, the electrostatic field is effective to attract the toner particles comprising the xerographic powder image from the drum surface and cause them to adhere electrostatically to the surface of the support material.

As the paper gripper mechanism continues to move forward in its closed circuit, it will strip the support material from the xerographic drum and carry it to a fixing device, such as, for example, heat fuser 46, whereat the developed and transferred xerographic powder image on the support material is permanently fixed thereto.

After fusing, the finished copy is preferably discharged from the apparatus at a suitable point for collection externally of the apparatus. To accomplish this there is provided a pair of delivery rolls 47 and 48 by means of which the copy is delivered to a copy holder after it is released by the gripper mechanism. Suitable cam means are provided at the receiving and delivery stations of the conveyor mechanism to actuate the paper gripper at these stations to receive or discharge a sheet of support material.

The next and final station in the device is a drum cleaning station E whereat any powder remaining on the xerographic drum after the transfer step is removed and whereat the xerographic drum is flooded with light to cause dissipation of any residual electrical charge remaining on the xerographic drum.

To aid in the removal of any residual powder remaining on the xerographic drum there is provided a corona precleaning device 51 that is substantially similar to the corona discharge device that is employed at charging station A. Removal of residual powder from the xerographic drum is effected by means of a web cleaner device 54 adapted to continuously feed a clean fibrous web material into wiping contact with the xerographic drum. As shown, the web material 55 is taken from a supply roll 56 and transported around a cleaning roll 57, preferably made of rubber, around a guide plate 58 to be wound on a take-up or rewind roll 61.

Any residual electrical charge remaining on the xerographic drum is dissipated by light from a fluorescent lamp 62 mounted in a suitable bracket above the xerographic drum, a suitable starter being provided for energizing the fluorescent lamp.

Suitable drive means drive the xerographic drum, the copy drum, the sheet conveyor mechanism at predetermined speeds relative to each other, and to effect operation of the paper separator roll, and the web cleaner mechanism, the latter being driven at a speed whereby relative movement between the xerographic drum and the web material is effected. Suitable drive means are also provided for effecting operation of the conveyor mechanism and toner dispenser of the developing apparatus assembly.

Referring now to the figures, there is provided a frame for supporting the components of the apparatus formed by left-hand plate 10, intermediate plate 11 and right-hand plate 12 connected together and maintained rigidly in spaced relation to each other by suitable tie rods 13 and 14.

Figure 7:
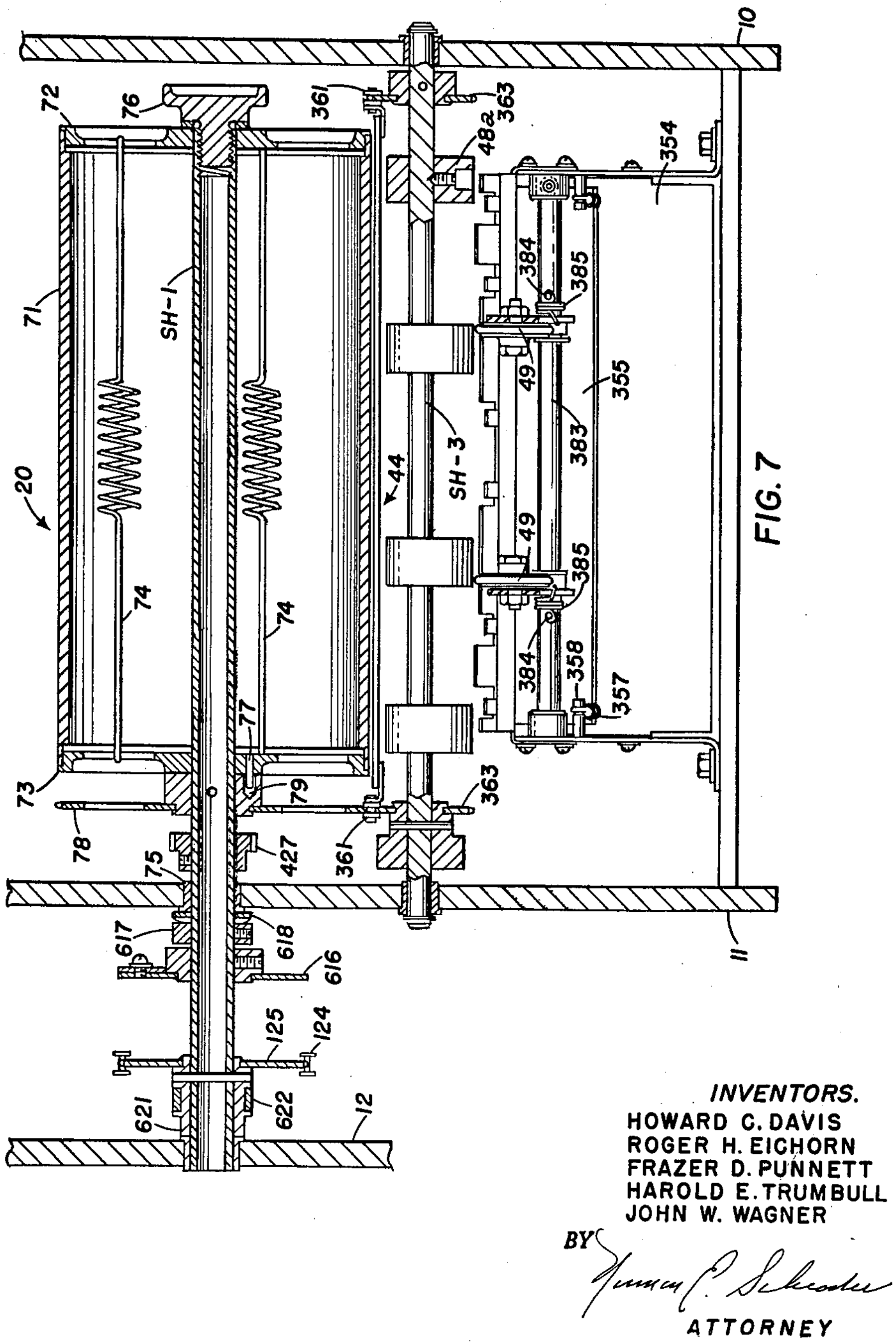
FIG. 7 is a sectional view taken along lines 7—7 of FIG. 5.
Figure 8:
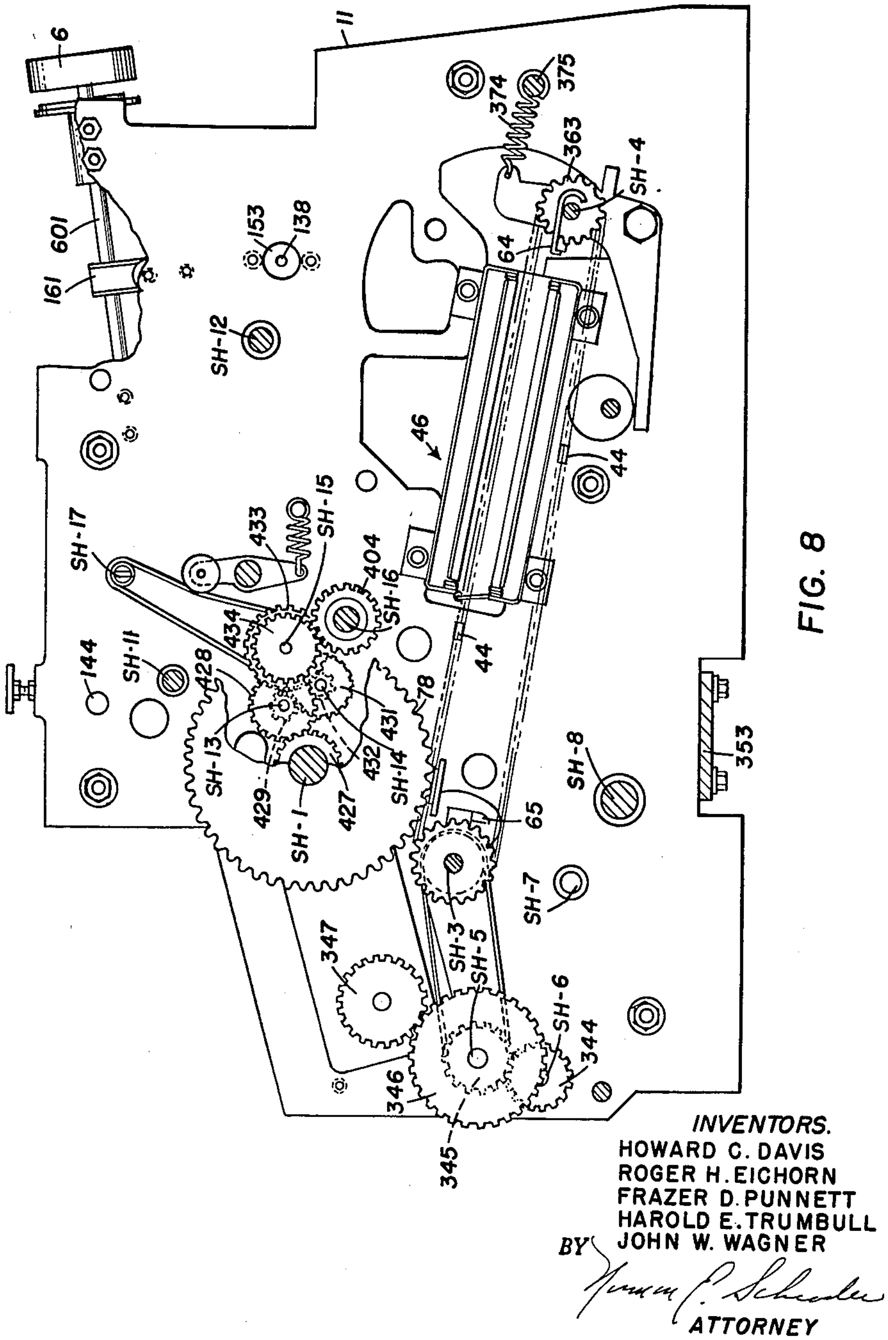
FIG. 8 is a sectional view taken along lines 8—8 of FIG. 4.

The xerographic drum 20, which includes a cylinder 71, having a layer of photoconductive insulating material on a conductive back, supported by drum hubs 72 and 73 biased toward each other by springs 74, is mounted on horizontal driven shaft SH–1 that rotates in bearings 75 mounted in plates 11 and 12. The free end or right-hand end of shaft SH–1, as seen in FIG. 7, is threaded to receive thumb nut 76 by means of which the pin 77 on hub 73 is held in driving engagement with the hub portion of the sprocket 78, the hub portion being provided with an aperture 79 to receive the pin.

*Exposure Mechanism*

Referring now to the subject matter of the invention the exposure mechanism of the xerographic reproducing apparatus is designed to use an optical projection or scanning mechanism adapted to scan a copy or document wrapped around a rotating copy drum and to project a flowing image of the copy or document onto the photoconductive surface of the rotating drum.

In the exposure mechanism shown, the scanning of the document or original is accomplished by means of a document feed mechanism constructed in accordance with the invention. The document feed mechanism includes a cylinder or copy drum to support the document or original to be reproduced in wrap-around relation on the cylinder or copy drum which is rotated relative to an optical system in synchronization with the rotation of the xerographic drum. Positioned adjacent to the cylinder or copy drum is a feeding station, sometimes referred to as a loading station, at which documents are fed, usually manually, to the copy drum. In the feeding station, a document is fed to the copy drum so that the leading edge of the document is parallel to the axis of the copy drum. The document is maintained in this position until the leading edge of the document is secured to the copy drum by means described in detail hereinafter.

The feeding station includes a guide 31, which is mounted between plates 10 and 11, through which a document or copy is moved forward into engagement with copy drum 22 and the document stops 101 of copy guide 32, the latter orientating and holding the copy in position to be gripped by the gripper fingers of the copy drum.

Figure 5:
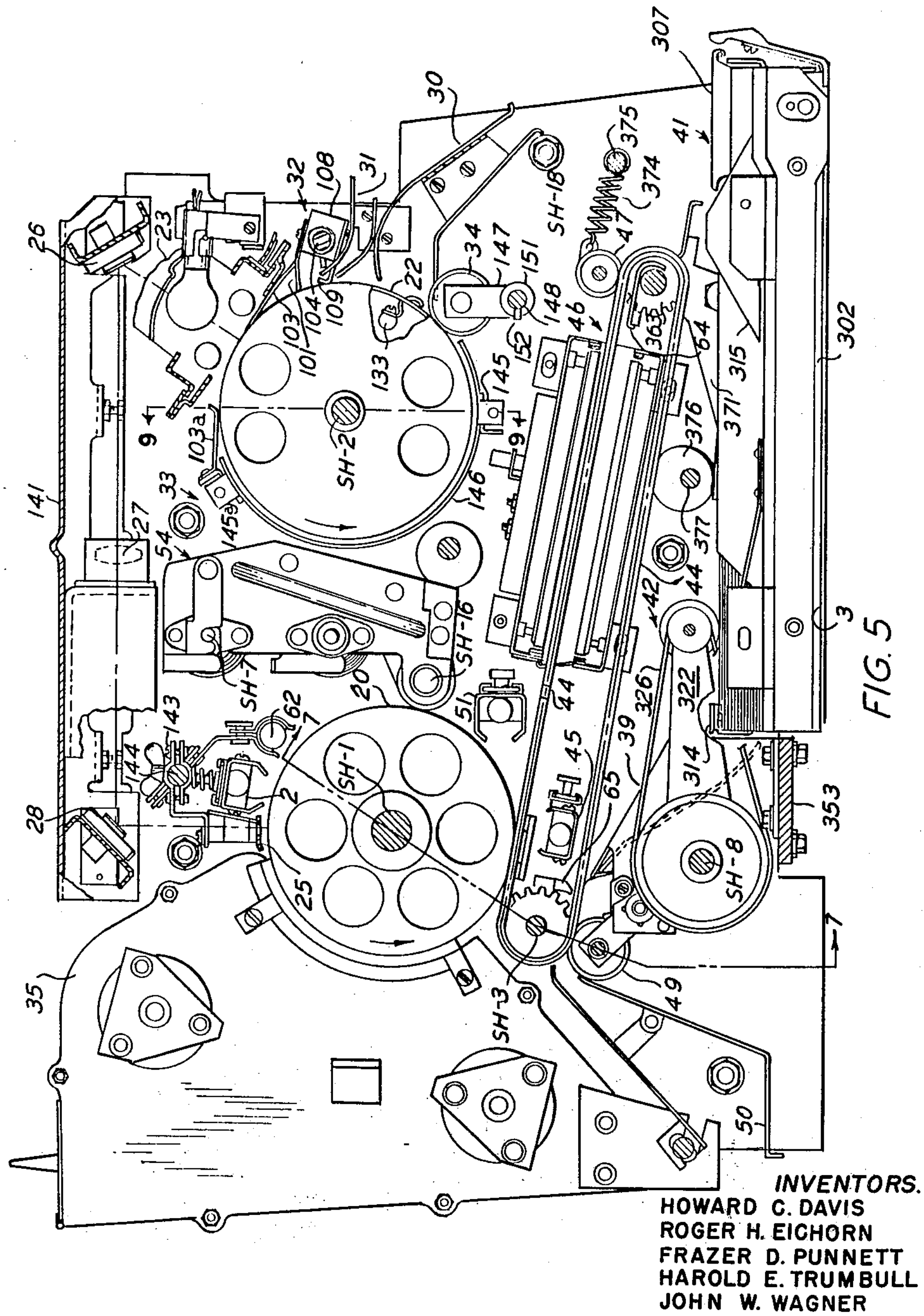
FIG. 5 is a left-hand side view of the apparatus with the left-hand frame plate removed.

Copy guide 32 includes document stops 101, actuator 102, retaining clips 109, and guides 103 carried by rod 104 journaled in bearings 105 positioned in plates 10 and 11, is held axially in alignment by means of retaining rings 106 positioned in suitable grooves formed in the rod adjacent the bearings. The rod is normally biased in a counter-clockwise direction, as seen in FIG. 5 for reasons described in detail hereinafter, by a spring 113 connected at one end to pin 111 extending radially from the rod and at its other end to a second pin 111 extending from plate 10.

Copy inserted through guide 31 by an operator is forced into contact with the copy drum 22 by the guides or retaining clips 109 and its forward progress is arrested by document stops 101 which also serve to align the leading edge of the document in parallel relationship to the axis of the copy drum.

In the embodiment shown two document stops are used, each of which is secured to a hub block 108, with a guide 103 superimposed thereover, by means of a screw 107. Each hub block 108 is loosely journaled on the rod and positioned axially thereon by means of retaining rings 106 retained in suitable grooves formed in the rod. The hub blocks 108 carrying the document stops 101 and guides 103 are each normally biased in a counter-clockwise direction, as seen in FIG. 5, around the rod by torsion springs 112, each spring being connected at one end to a pin 111 extending from a hub block 108 and at its other end to a pin 111 extending radially from the rod. The pins 111 are positioned in interfering relationship with each other to limit the arc of travel of the hub blocks around the rod.

The document stops 101 normally biased, as previously described, into contact with the copy drum to retain and align each document prior to engagement by the copy drum are disengaged by means of the actuator 102 secured to the rod in a manner described hereinafter, to release the documents to the copy drum.

The retaining clips 109 are also mounted on hub blocks **108*a*** loosely journaled on the rod in an off-center position so that the blocks will rotate by their own weight to force the clips into contact with the copy drum or on a document sandwiched therebetween with sufficient force to hold a document against the copy drum while still permitting a document to be inserted between the copy drum and the retaining clips as a copy is forwarded therebetween.

The copy drum 22 includes a cylindrical wall portion 115 secured as by welding to end plates 116 and **116*a*, the latter carrying a hub 117 by means of which the drum is secured to shaft SH–2. Shaft SH–2 is supported by flanged bearings 118 positioned in plates 10 and 11, and held in axial alignment by means of retaining rings 121 positioned in suitable grooves provided in the shaft, thrust bearings 122 and 123** being provided between the flanged bearings and the retaining rings.

The copy drum is driven in timed relation with the xerographic drum by means of chain 124 which runs on sprockets 125 and 126, fixedly mounted on shafts SH–1 and SH–2, respectively, an idler sprocket 127 being movably secured to plate 12 to permit adjusting the tension on chain 124.

Figure 6:
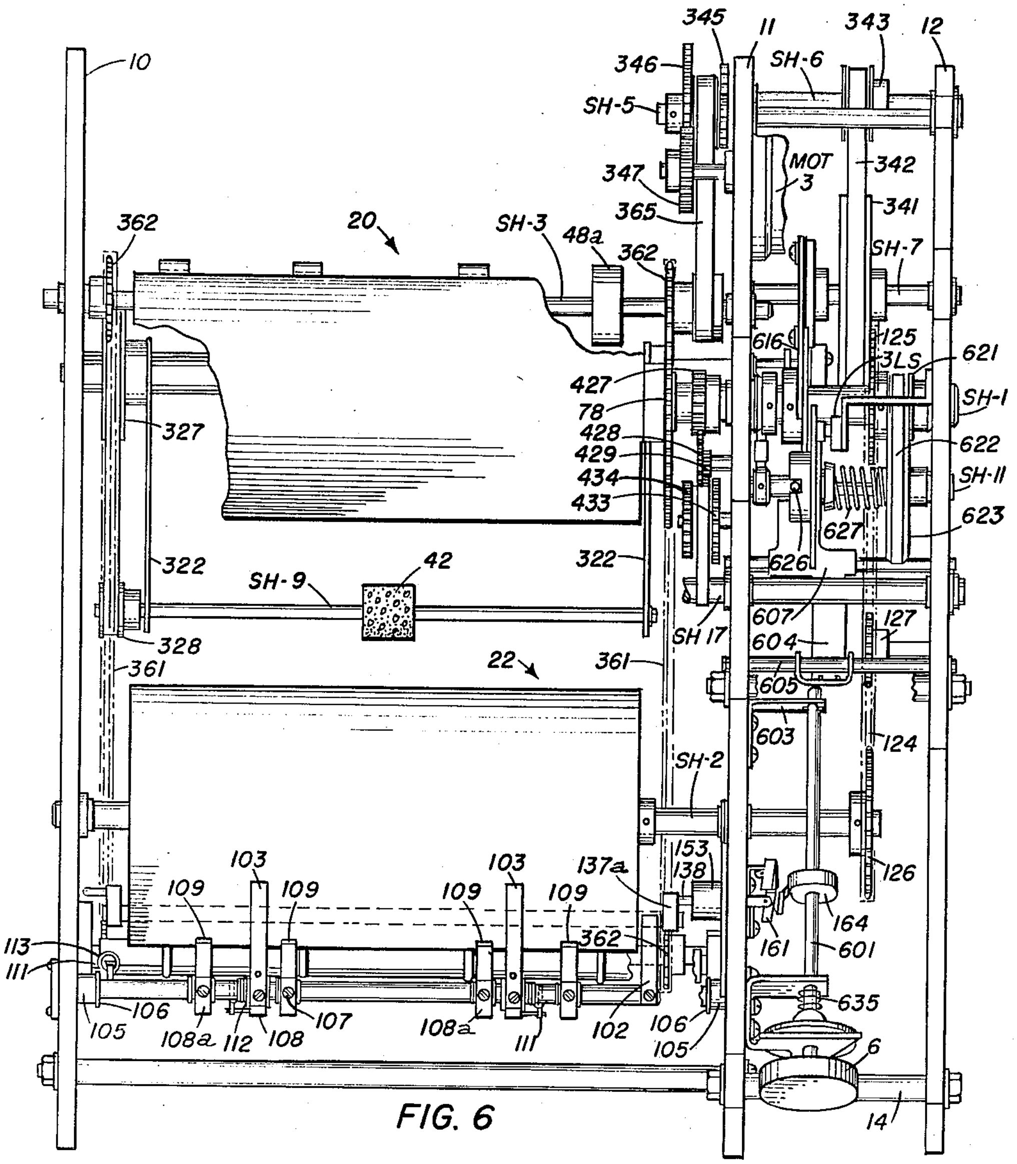
FIG. 6 is a top view of the apparatus similar to FIG. 4, but with the optical mechanism and the developer mechanism removed.
Figure 9:
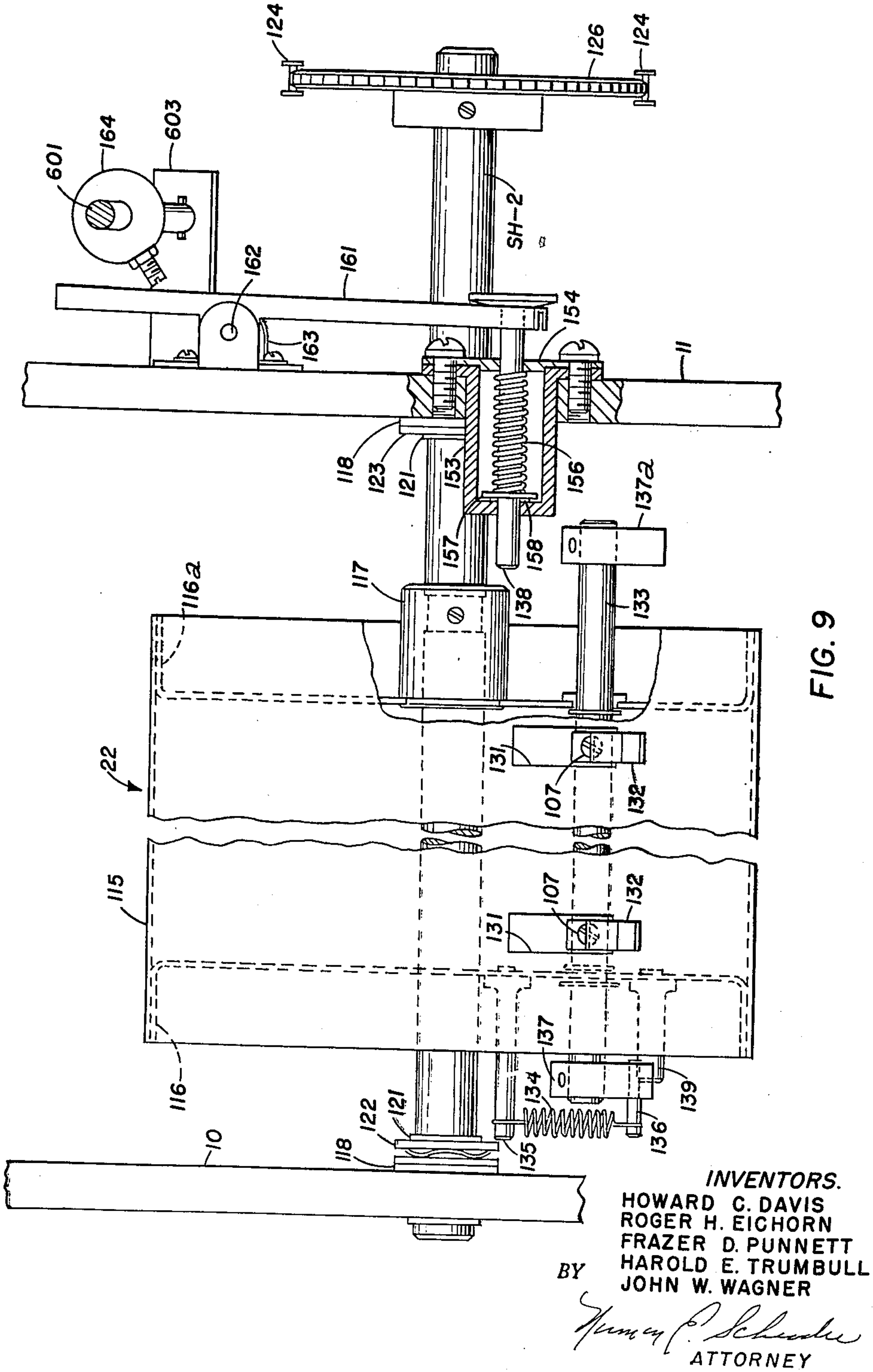
FIG. 9 is a sectional view taken along lines 9—9 of FIG. 5.
Figure 10:
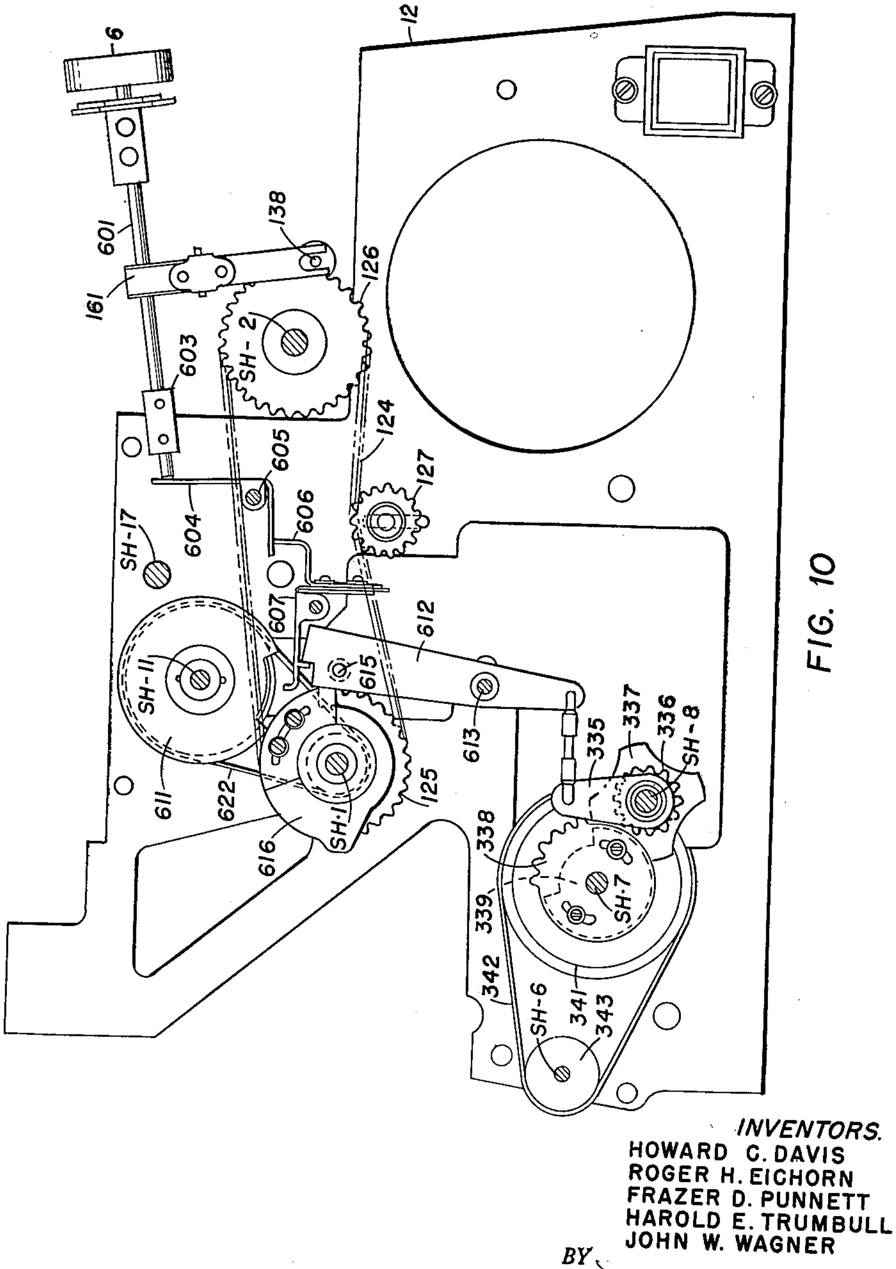
FIG. 10 is a sectional view taken along lines 10—10 of FIG. 4.

The peripheral surface of the copy drum is provided with slots 131 parallel and in line with each other through which gripper fingers 132 extend to grip the leading edge of a document against the peripheral surface of the copy drum. The gripper fingers are secured by screws 107 on rock shaft 133 which is rotatively mounted in the end plates of the copy drum in such a manner that upon rotation of the rock shaft the gripper fingers are moved in unison into and out of operative pressure relationship with the peripheral surface of the copy drum. The gripper fingers are normally biased into operative pressure relationship against the peripheral surface of the copy drum by means of a spring 134 secured at one end to a stud 135 extending from end plate 116 and connected at its other end to pin 136 extending from lever 137 secured to the left-hand end of the rock shaft as seen in FIG. 6. A second lever 137 is secured to the right-hand end of the rock shaft as seen in FIG. 9 in position to be engaged by interposer shaft 138 for opening the gripper mechanism to receive a document or to release a document. The interposer shaft 138 for opening the gripper mechanism is adapted to be moved manually either into position for operative engagement with the lever **137*a*** on the rock shaft as the drum rotates, or alternatively into position so as to clear the lever for the purpose described in greater detail hereinafter. When the interposer shaft 138 is in its operative position as shown in FIG. 9, the rock shaft is automatically actuated during each revolution of the copy drum so that a document retained by the gripper fingers is released for delivery to a return tray 3 and the gripper fingers remain open sufficiently long enough to receive a new or second document. To limit the radial movement of the rock shaft a stop stud 139 is secured to end plate 116 to stop radial movement of lever 137.

To permit multiple scanning of a document the interposer shaft 138 is moved out of interference relation (to the right in FIG. 9) of lever 137*a* by an operator through the manipulation of control knob 6 as described in greater detail hereinafter.

The interposer shaft 138 is slidably journaled in a housing 153 and housing cap 154 secured to frame plate 11 by means of screws 155 threaded therein. The interposer shaft 138 is normally biased into interference relation with cam 137*a* by means of spring 156 encircling the interposer shaft and abutting at opposite ends against the housing cap 154 and the spring washer 157 held in place by retaining lock 158 positioned in a suitable groove formed in the interposer shaft.

An actuator lever 161, journaled on pin 162 positioned in bracket 163 secured to frame plate 11, is used to move the interposer shaft out of interference relation to cam 137*a*. The bifurcated end of the actuator lever encircles the interposer shaft behind the head formed at one end thereon, and at its other end the actuator is positioned to be actuated by a cam 164 fixed to control shaft 601.

To permit a document retained by the document stops to be gripped by the gripper fingers of the copy drum, the actuator 102 of copy guide 32 is positioned on rod 104 so that it extends beyond the right-hand edge of the copy drum in interference relation with the rock shaft 133 whereby the rod 104 is moved clockwise as seen in FIG. 5 to rotate the document stops out of engagement with the leading edge of the document in timed relationship with the gripping of the leading edge of the document by the gripper fingers 132.

As the document, gripped at its leading edge between the gripper fingers and the peripheral surface of the copy drum, is transported thereby through the copying station, as defined by the slotted light reflector 23, successive portions of the document are uniformly illuminated by lamps 29. As shown in the electrical wiring diagram four lamps are used to illuminate the copy, that is, a pair of fluorescent lamps LMP–2 and LMP–3 and a pair of incandescent lamps LMP–4 and LMP–5. To receive the image of the document reflected through the light reflector there is provided an object mirror 26 which reflects the image through lens 27. An image mirror 28 is positioned in the light path from the lens to reflect the image onto the drum through the slot aperture of the light shield 24. The lens 27 and the two mirrors are suitably secured to an optical mounting bracket 141 secured to the top of plates 10 and 11. Light baffles 142 are secured to the underside of the optical mounting bracket 141 to shield the lens 27 from extraneous light.

The light shield 24 is simply an open elongated box, the bottom wall of which has a narrow slot aperture 25 extending across its length. The light shield is suitably mounted, by clamp assembly 143 to arbor 144 extending between plates 10 and 11, directly above and in close proximity to the peripheral surface of the xerographic drum with the center line of the slot aperture parallel to the axis of shaft SH–1. As a document is conveyed through the copying station the trailing portion of the document is retained against the peripheral surface of the copy drum by document guides 103 on rod 104 and then, as is leaves the copying station, by a second set of document retaining clips 103*a* of paper guide 33. These guides also perform the function of holding creased or wrinkled documents flat in the exposure region. As shown, the paper guide 33 consists of a pair of supports 145 and 145*a* secured to the side plates 10 and 11, curved document guides 146 extending between the supports and with the second set of document retaining clips 103 secured to the support 145*a* in position for the curved portion of the document retaining clips to ride against the peripheral surface of the copy drum.

After a document has been scanned, the rock shaft 133 is actuated to release the document whereby it is forwarded by feed-out rollers 34 coacting with the peripheral surface of the copy drum through the document feed-out guides 30 to return tray 3.

The feed-out rollers 34 are rotatably mounted on arms 147 journaled on axle 148 secured against rotation between the plates 10 and 11, each of the arms 147 being biased by means of a torsion spring 151 to yieldingly force the feed-out rollers carried thereby against the peripheral surface of the drum or against a document sandwiched therebetween, one end of each spring butting against a radial pin 152 extending from the axle and the other end of each spring butting against the arm 147 with which it coacts.

A supply of cut sheet support material such as paper 301, to be fed one at a time to the sheet conveyor mechanism 43 is held in a paper tray 41 movably positioned at the front of the machine between the frame plates 10 and 11 by means of a pair of conventional drawer slides 302 and 303. The paper tray is positioned above the collecting tray 3 which is also slidably mounted on a pair of conventional drawer slides (not shown) so that either of these trays can be extended beyond the outer margin of the cabinet of the machine.

Figure 2:
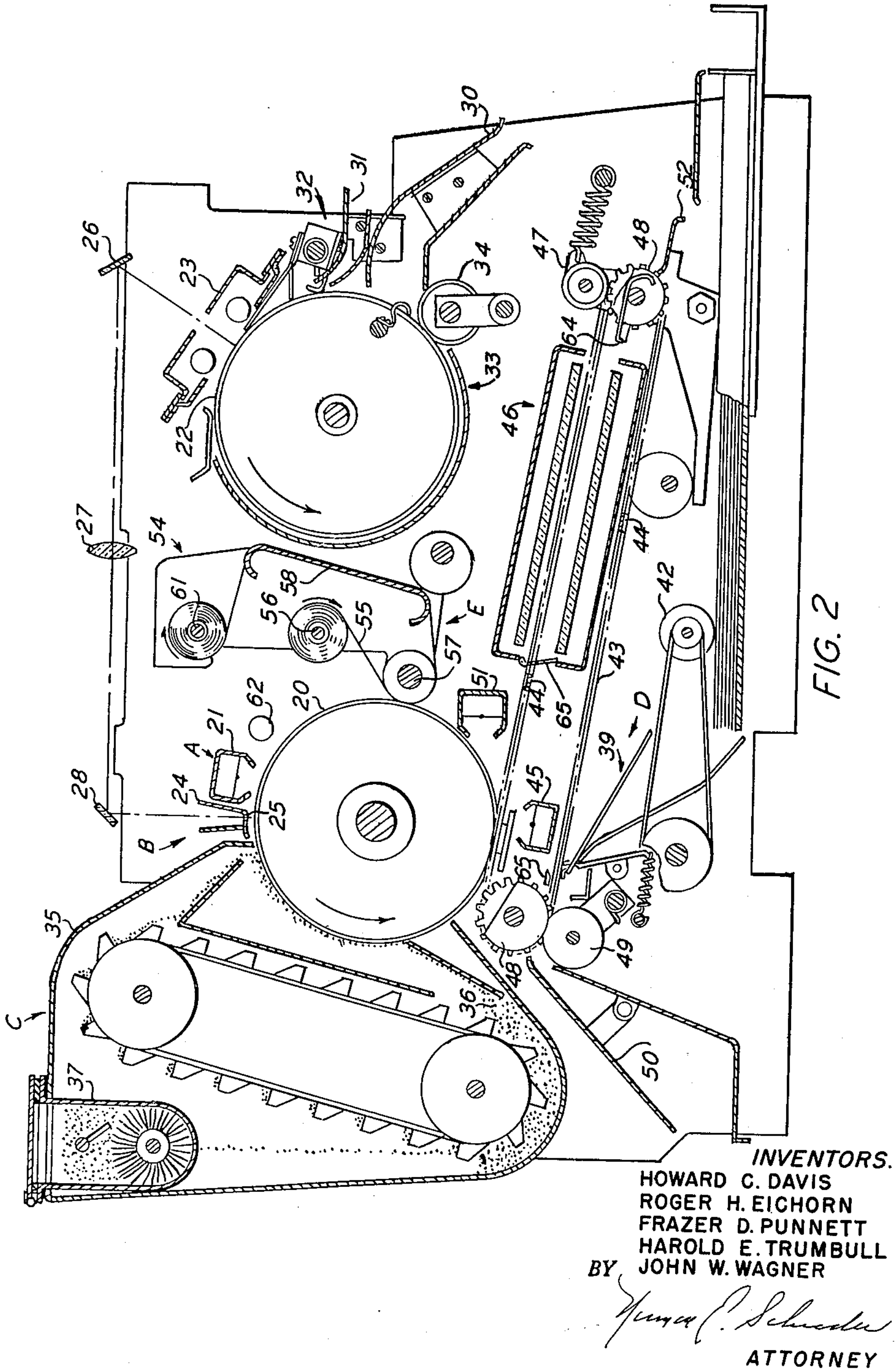
FIG. 2 is a schematic illustration of the apparatus of the invention.
Figure 3:
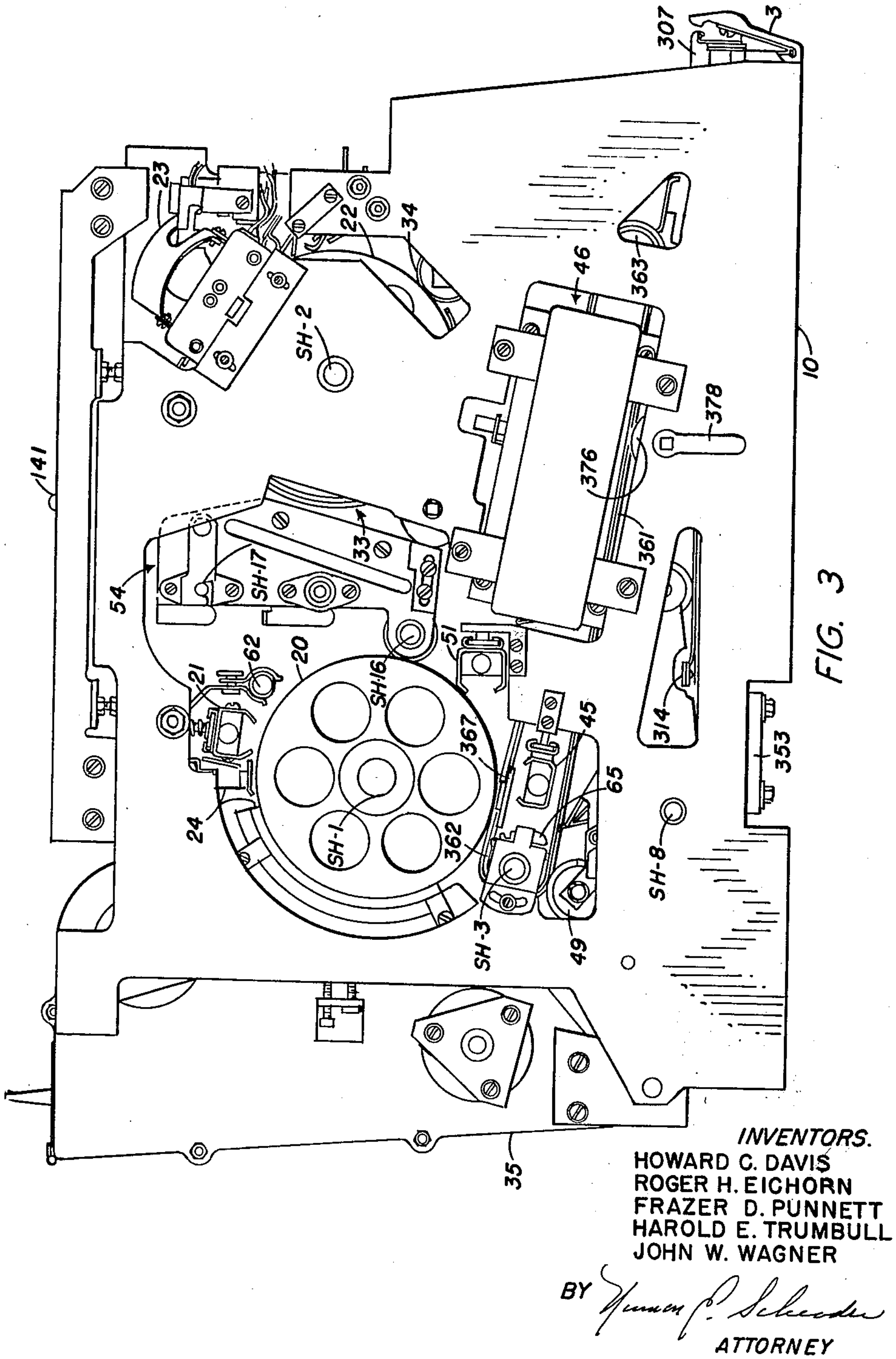
FIG. 3 is a left-hand view of the apparatus of the invention, with the cabinet covers removed.
Figure 4:
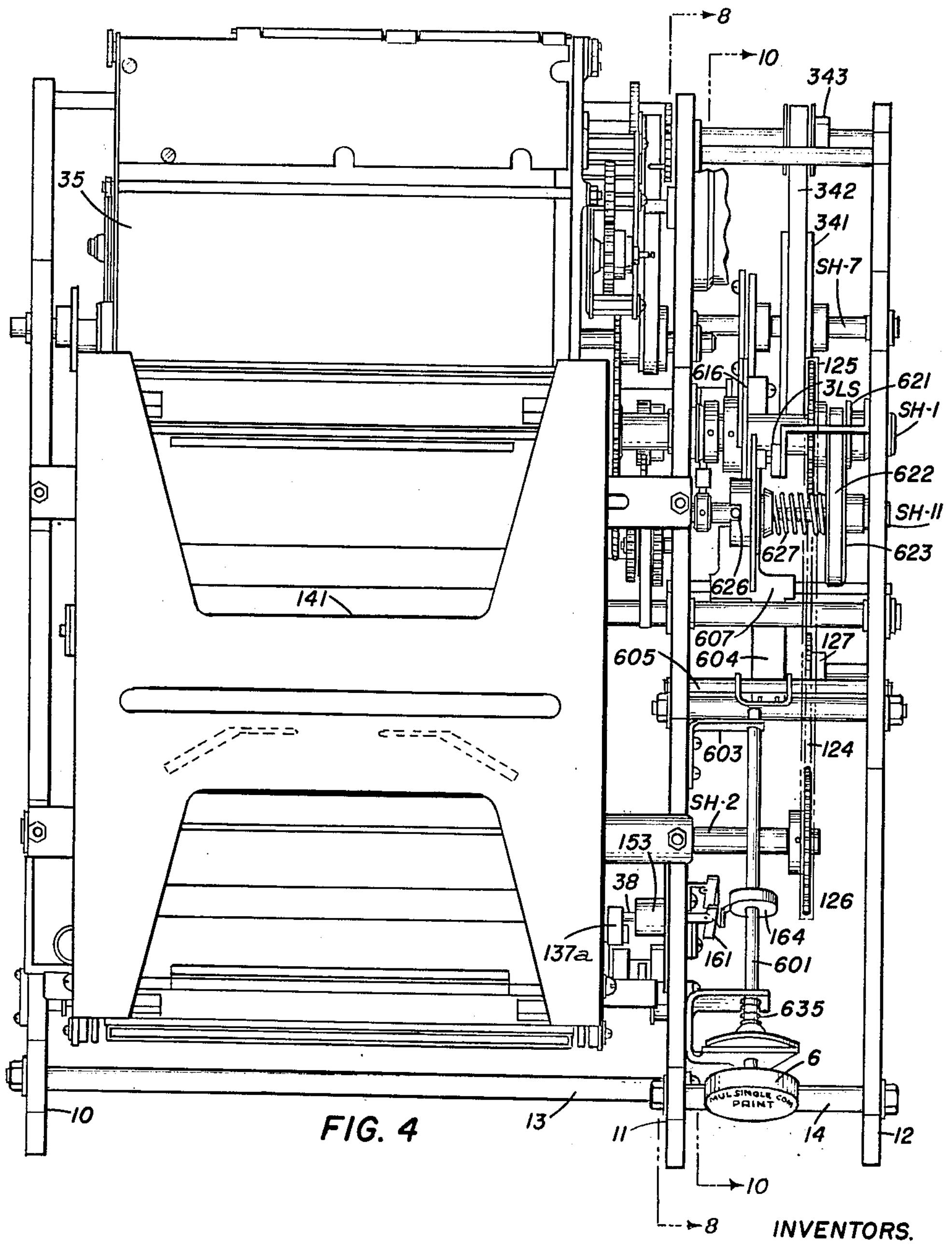
FIG. 4 is a top view of the apparatus of the invention.

The paper tray 41 includes a platform 304, vertical side walls 305 and an end wall 306, the latter having a guide plate 307 hinged thereon for purposes to be described in greater detail hereinafter. In order to insure separation of the topmost sheet from the remainder of the stack of support material in the tray, there is provided a left-hand corner separator 308 and a right-hand corner separator 309 positioned and secured on opposite sides of the platform. Each corner separator includes a substantially vertical front stop portion 311 for aligning the leading edges of the sheets, and an inwardly extending lip portion 312 adapted to rest upon the topmost sheet of the stack to act as a stripper pin, as is well known in the art, and a spring extension strip portion 313 by means of which the lip portion of the corner separator is continually biased into contact with the topmost sheet of the stack. Cam follower buttons 314 are secured to the corner separators in position to be engaged by cams 315 connected on a portion of the drawer slides secured to the frame plate 10 and 11, whereby as a paper tray is withdrawn from the position shown in FIGS. 2 and 4 to permit the placing of a new stack of support material in the tray, the cams will cause the corner separators to lift sufficiently high above the bottom plate so that a stack of support material can be placed under the corner separators. As the paper tray is again advanced to its normal operating position as shown in FIGS. 2 and 5, the buttons 314 slide off the cams to engage the leading edges of the sheets in the stack as shown in these figures.

Figure 13:
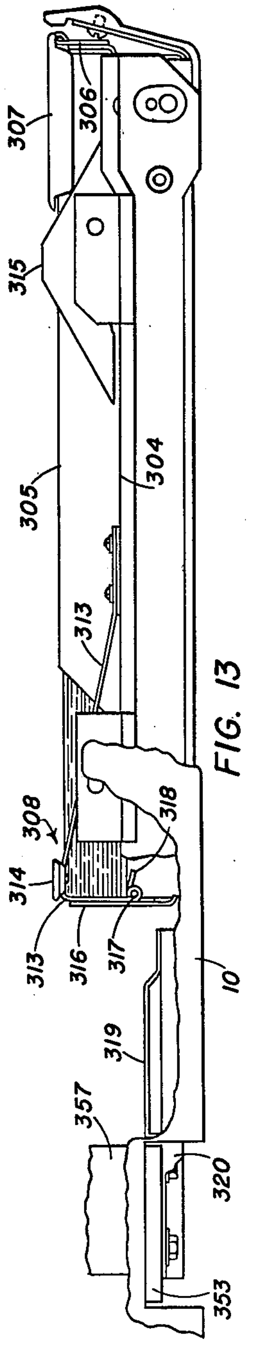
FIG. 13 is an enlarged left-hand view of the paper tray assembly.
Figures 14, 15:
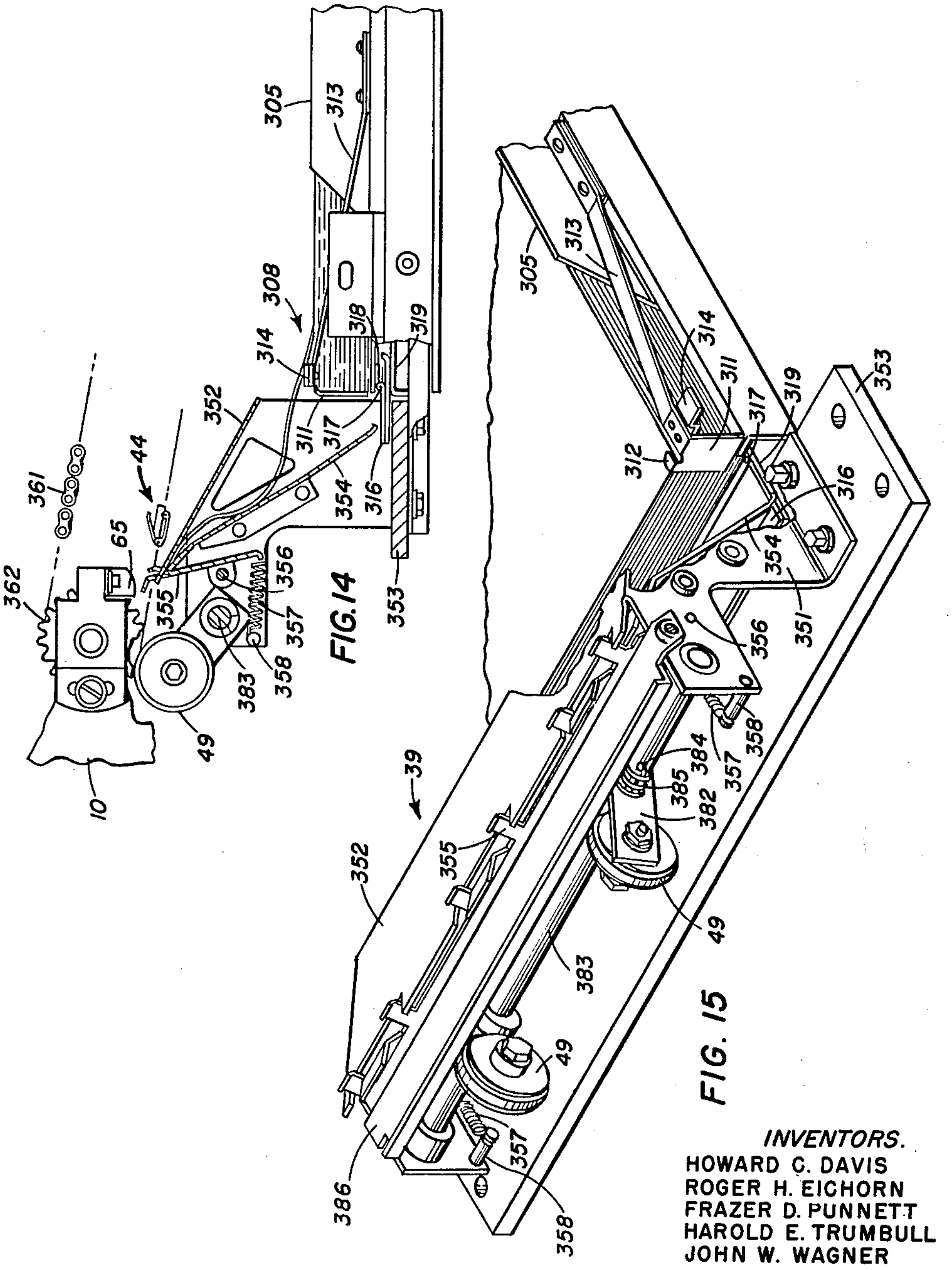
FIG. 14 is a sectional view of the paper guide mechanism and elements cooperating therewith.
FIG. 15 is a perspective view of the paper guide mechanism.
Figure 16:
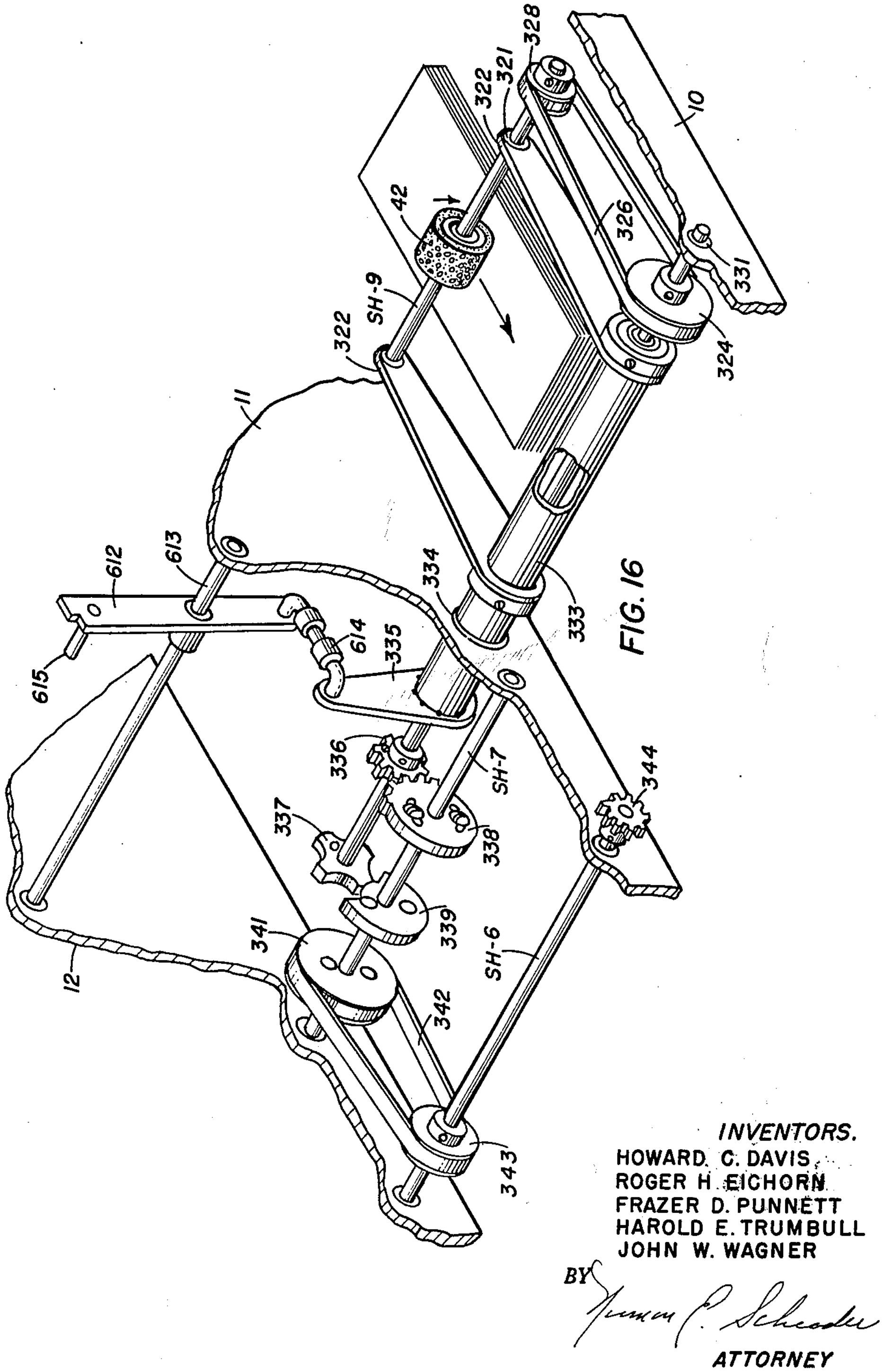
FIG. 16 is an exploded perspective view of the paper separator mechanism.
Figure 17:
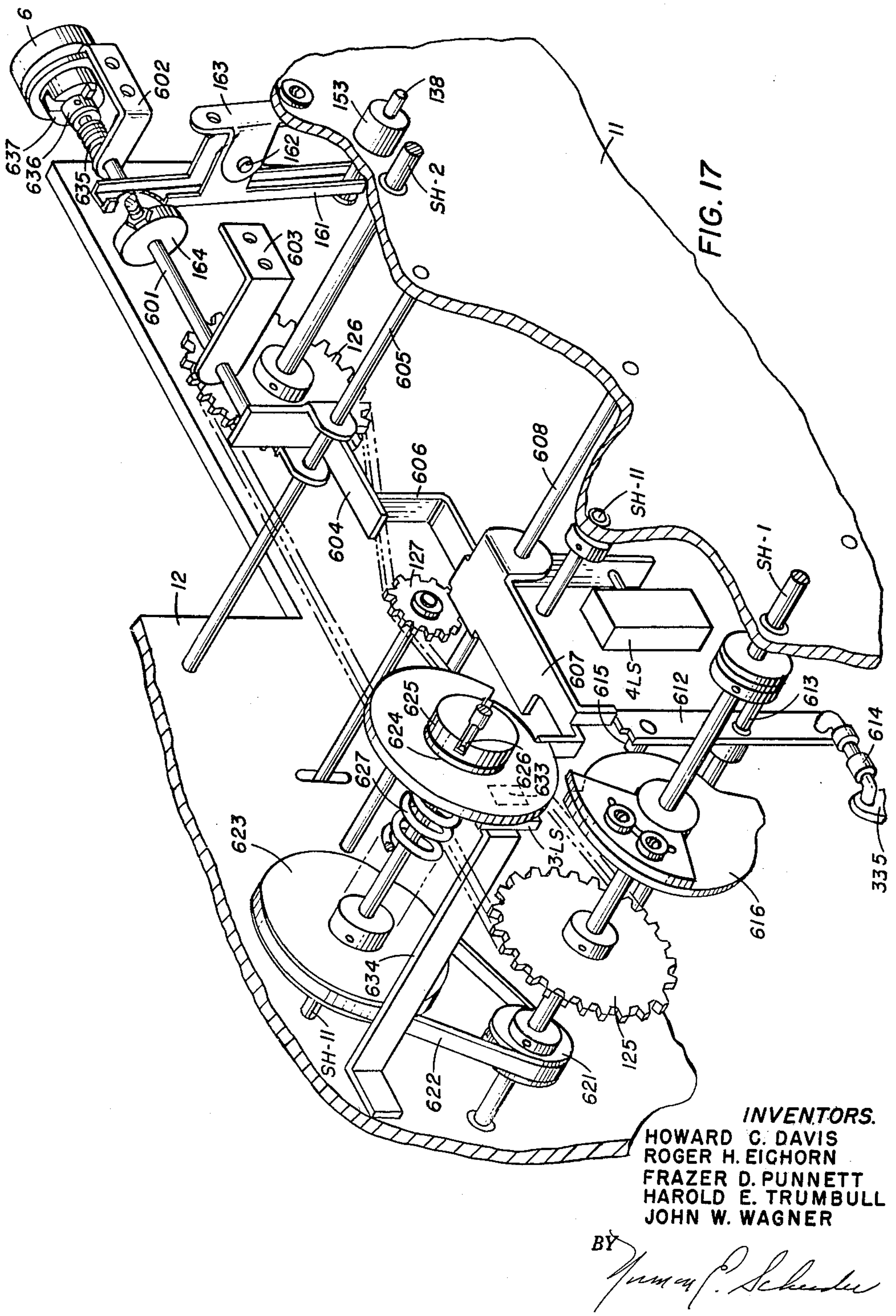
FIG. 17 is an exploded perspective view of the mechanical control mechanism of the apparatus.

To align the leading edges of the sheets prior to the engagement of the corner separators thereon, there is provided a gate 316 pivotally secured by hinge 317 in the left-hand end of the paper tray as seen in FIGS. 13 and 14. A spring 318 is secured to the gate to normally bias the gate into a vertical position. A depending finger portion on the gate is positioned to engage a cam 319 secured to brace 320 so that when the paper tray is advanced to its operative position as shown in FIG. 2 the gate is forced to swing downward, out of interference relationship with the sheets in the paper tray so that they may be advanced by the separator roller 42 into the guide 39.

To feed sheets of support material one at a time from the paper tray to the guide for pick-up by the sheet conveyor, there is provided a paper feeding and separating means comprising an intermittently driven separator roller 42 mounted on a driven shaft SH–9 journaled in suitable bearings 321 mounted in one end of arms 322, the opposite end of the arms being suitably secured, as by welding, to torque tube 333.

As shown, the separator roll 42, usually made of rubber or other suitable material, is secured, as by bonding, to a cylindrical core 323 which is mounted by means of a conventional slip clutch 324 on the shaft SH–9 and is held in position thereon by means of end plates 325. The slip clutch permits the separator roll to be rotated, either by rotation of shaft SH–9, or by frictional contact with a sheet of support material as the sheet is pulled forward by the sheet conveyor.

Shaft SH–9 is driven by shaft SH–8 by means of belt 326 which runs on pulleys 327 and 328 fixedly mounted on shaft SH–8 and SH–9, respectively. Shaft SH–9 is held in axial alignment in the arms 322 by the pulley 328 secured to the shaft outboard of one arm and by a retaining ring 329 positioned in a suitable groove in the shaft outboard of the other arm.

Shaft SH–8 is journaled at one end in bearing 331 positioned in frame plate 10, and intermediate its ends by means of bearings 332 positioned within torque tube 333 rotatably positioned by means of flanged bearing 334 mounted in frame plate 11, whereby either the torque tube or the shaft SH–8 can be rotated with respect to each other.

The torque tube 333 encircling shaft SH–8 is thus mounted about the axis of the shaft to be oscillated by lever 335 fixed thereon, so that separator roll 42 is moved from a first position out of contact with the sheets in the supply tray to a second position in which the separator roll is moved into friction contact with the top sheet in the supply tray.

Figure 11:
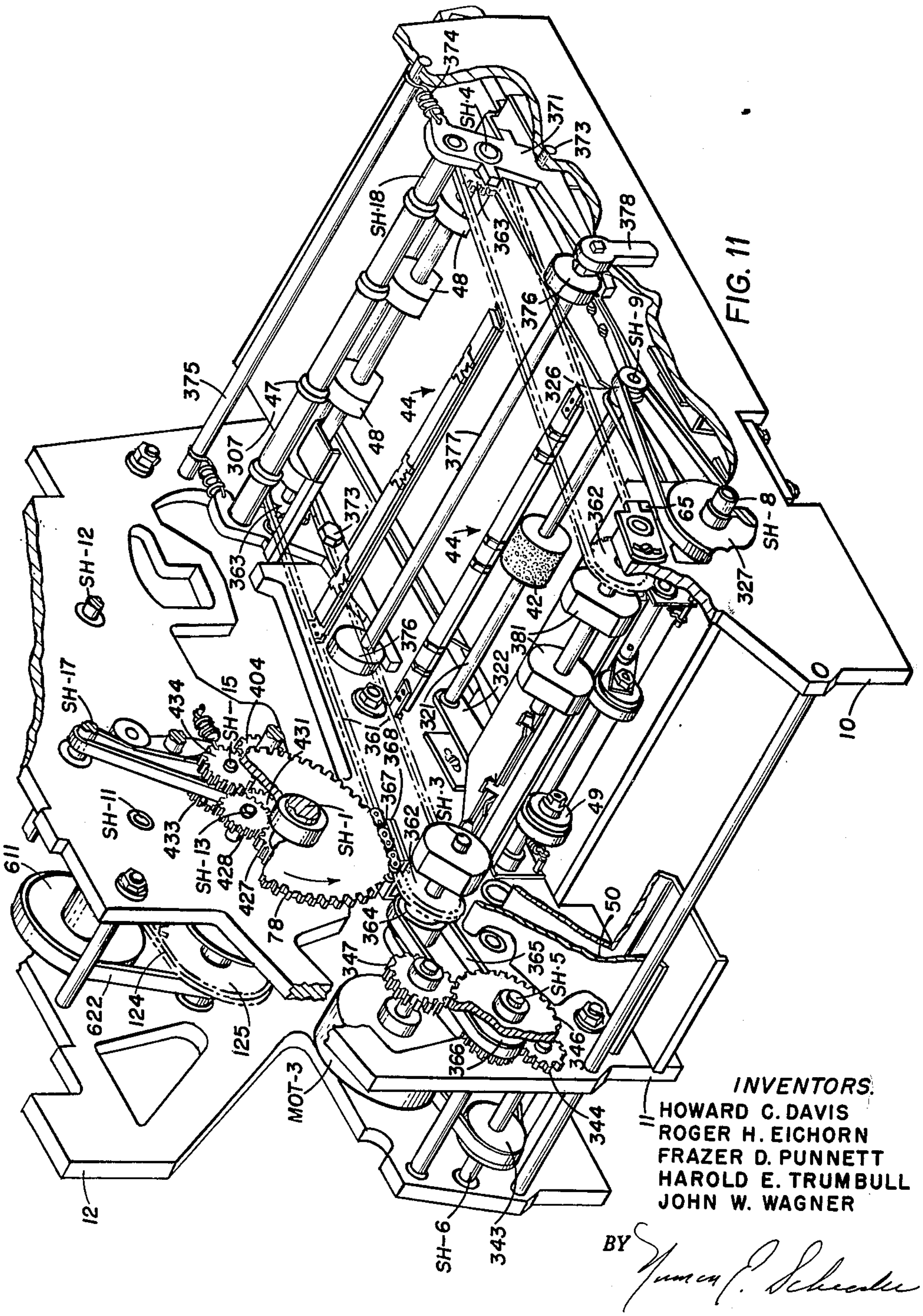
FIG. 11 is a perspective view of the paper feed mechanism of the apparatus.
Figure 12:
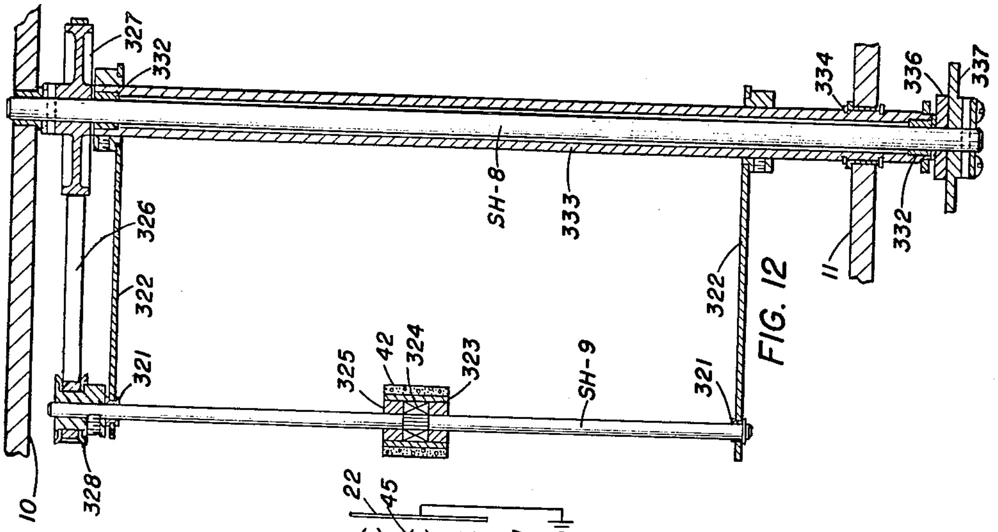
FIG. 12 is a sectional enlarged view of the paper separator mechanism.

While the separator roll is in contact with the top sheet, it is rotated in the direction shown by the arrow in FIG. 11 to separate the topmost sheet and forward it to guide 39. Shaft SH–9, which supports the separator roll, is operatively connected by means of the belt 326 to shaft SH–8, as previously described, shaft SH–8 being intermittently driven by means of the gear 336 and segmental index lock 337 secured thereon which engage the segmented gear 338 and the segmental lock 339, respectively, mounted on shaft SH–7. Shaft SH–7, journaled in suitable bearings positioned in frame plates 11 and 12, is operatively connected to shaft SH–6 by means of timing belt 342 which runs on pulleys 341 and 343 connected to shafts SH–7 and SH–6, respectively. Gear 344 fixed on the end of shaft SH–6, which extends beyond frame plate 11, engages gear 345 fixed on intermediate shaft SH–5 operatively connected to the main drive motor MOT–3 by gears 346 and 347 fixedly mounted on shaft SH–5 and on the shaft of motor MOT–3, respectively.

When the separator roll is brought into contact with the top sheet of paper in the supply tray and rotated in the direction shown, it will forward a sheet of support material into the guide 39 where its forward progress is stopped by the gate at the outlet of the guide. The separator roll continues to rotate to feed the topmost sheet, causing the sheet to buckle in the guide for a purpose to be described in detail hereinafter.

Referring now to the guide 39, it includes a paper frame having two vertical side walls 351 and a connecting upwardly slanting paper slide 352 formed integral therewith, which is secured to a mounting plate 353 positioned directly beneath the sheet conveyor, the mounting plate being fastened to the frame plates 10 and 11. A lower flanged paper slide 354 extends between the side walls of the paper frame to form with the paper slide 352 a receiving chute for the sheet material forwarded by the separator roll. The trailing edges of these two slides are suitably notched to permit a gate 355 to be movably positioned to close the discharge end of the chute. The gate 355 is pivotally mounted on a gate shaft 356 extending between and secured to the side walls 351 of the paper frame and is normally biased into position to close the discharge end of the chute by means of springs 357. Each of these springs are secured at one end to the gate and at its opposite end to a pin 358 mounted on a side wall of the paper frame. As seen in FIGS. 14 and 15 the upper portion of the gate 355 has bent closure members formed thereon adapted to rest, when biased by the spring 357 against the trailing edges of the paper slides to close the opening in the chute, the closure members which rest against the upper slide extend beyond the slides in interference relationship with a paper gripper 44 as it passes thereover, so that, the gate is actuated by a paper gripper to release a sheet thereto.

A sheet of support material, such as paper, forwarded by the separator roll to the guide 39 is forwarded from the guide by endless conveyor to the xerographic drum adjacent to corona transfer device, whereat a xerographic powder image previously formed on the drum is transferred from the drum to the sheet. The sheet is then forwarded by the conveyor to the heat fuser 46 whereat the powder image on the sheet material is permanently fused thereon, and then to the set of delivery rolls 47 and 48 which deliver the sheet of support material to the return tray 3.

Referring in particular to FIGS. 7 and 11, the conveyor 43 includes two endless roller chains 361 which pass from a set of drive sprockets 362 carried by shaft SH–3 to, and around a set of sprockets 363 on shaft SH–4 which guide the chains in a path tangential to the surface of the xerographic drum. These two sets of sprockets are fixedly positioned on their respective shafts to space the chains apart from each other by a distance greater than the length of the drum to afford complete use of the xerographic drum plate surface.

In the embodiment of the conveyor apparatus shown, the chains carrying the two paper grippers 44 are equally spaced from each other along the length of the chains, and positioned on the chains at right angles to the path of travel of the chain for movement therewith and in a circuit between sheet receiving and sheet delivery stations identified, respectively, as the output of the paper guide 39, and the delivery rollers 47 and 48. Means are provided at these stations to cause the paper grippers to take hold of the front or leading edge of a sheet of support material at the receiving station, that is, from guide 39, and to hold this sheet while traveling to the delivery station and there to release the sheet for discharge by the delivery rollers from the machine.

Two paper grippers are used in the preferred embodiment of the machine so that as one paper gripper moved from the receiving station carrying a sheet of transfer material to the delivery station, the other paper gripper will move from the delivery station to the receiving station to be in position to receive the next sheet of support material.

Conveyor shaft SH–3, carrying the drive sprockets 362, is journaled in the frame plates 10 and 11 and is driven by pulley 364 connected by drive belt 365 to pulley 366 fixed on shaft SH–5 between the gears 345 and 346.

To insure synchronized movement of a sheet of support material with the xerographic drum to effect registered transfer of the powder image from the drum to the sheet material, the xerographic drum is driven by means of a chain conveyor. The sprocket 78, secured to the drum shaft SH–1, is positioned thereon to be driven by the right-hand chain 361, as seen in FIG. 6, that is, the chain nearest frame plate 11. The pitch diameter of the sprocket 78 is equal to the diameter of the drum so that the lineal surface speed of the drum is equal to the speed of travel of the chain of the sheet conveyor, as represented by the pitch line of the chain. To insure effective engagement of the chain with the sprocket 78 there is provided a guide 367 positioned adjacent to the sprocket by means of a bracket 368 secured to plate 11 which forces the chain into driving relation with the sprocket. The guide 367, formed in the shape of an inverted T, is positioned so that chain is guided into contact with the sprocket 78, with the pitch line or center of the chain moving in a path tangentially to the pitch line diameter of the sprocket to insure positive contact between the chain and the sprocket and to eliminate the possibility of any backlash occurring between the chain and the sprocket.

Shaft SH–4, carrying sprockets 363 thereon, is suitably journaled at its opposite ends in a left-hand conveyor support 371 and a right-hand conveyor support 372 pivotally secured by means of shoulder screws 373 to frame plates 10 and 11, respectively, whereby the shaft SH–4 can be oscillated in an arc about the axis of the shoulder screws from a first position in which tension is applied to the chains of the conveyor, to a second position in which the chains are slackened sufficiently to either permit replacement of a chain or replacement or removal of the xerographic drum from the machine.

Springs 374 connected at one end to the conveyor supports and at their other end to a rod 375, fixed in frame plates 10 and 11, are used to normally bias the conveyor supports in a clockwise direction as shown in FIG. 11 to maintain the chains of the conveyor mechanism in tension. To permit an operator to release the tension on the chains of the conveyor to either replace a chain or to permit removal of the xerographic drum, there is provided a pair of cams 376 fixed to a cam actuator shaft 377, suitably journaled in frame plates 10 and 11, by means of which an operator can rotate the conveyor supports in a counterclockwise direction as shown in FIG. 11 against the biasing action of the spring to release the tension on the chains. The cam actuator shaft 377 is provided with a squared end portion extending beyond frame plate 10 adapted to receive a lever 378 by means of which the operator can rotate the cams.

Fixed to the shaft SH–3 for rotation therewith are four D-shaped paper guide rolls 48A, the center two of which coact with the paper abort rolls 49 to feed a sheet of support material through the abort paper guide 50 from the machine, if for any reason a sheet forwarded by the separator roll is not adequately gripped by a paper gripper for delivery through the transfer station of the machine. The abort rolls 49 are suitably rotatably mounted on a pair of abort arms 382 suitably journaled on the abort pivot shaft 383 secured to the side walls of the paper guide 39. The abort rolls 49 are normally biased in the direction toward the paper guide rolls to contact the paper guide rolls by means of torsion springs 385, each of which is secured at one end to a pin 384 extending radially from the abort pivot shaft and its other end connected to an abort arm. Movement of the abort rolls toward the paper guide rolls is limited by a paper abort stop 386 adjustably secured to the side walls 351 of the paper guide whereby the movement of the abort rolls can be carried by the abort arms adjusted to prevent them from riding over the cord portion of the D-shaped paper guide rolls.

A set of rolls 48 similar to the D-shaped paper guide rolls 48A, are fixed to shaft SH–4 for rotation therewith, these rolls cooperating with the delivery rolls 47 to feed sheets of support material from the machine. The delivery rolls 47, preferably made of rubber or similar material, are mounted for rotation therewith on idler shaft SH–18 suitably journaled at opposite ends in the left-hand and right-hand conveyor supports.

In the embodiment shown the paper grippers are positioned to grip the leading edge of a sheet of support material in position to travel substantially along the pitch line of the chain, and of course as the sheet travels around the sprockets 362 and 363 the leading edge of the sheet will travel in a path equal to the pitch line of the sprockets. As previously described, the lineal speed of travel of the paper gripper as carried by the chain is equal to the peripheral speed of the xerographic drum, and the sheet of support material is pulled by its leading edge to and from the drum at a constant rate whereby it is prevented from slipping with respect to the peripheral surface of the drum. However, since a straight line path of travel of the support material to and from the drum cannot be accomplished by a conveyor of the length shown, the radius of the peripheral surface portion of the D-shaped paper guides 48A and the delivery rolls 48, in the embodiment shown, is made equal to the pitch radius of the sprockets 362 and 363 to permit the sheet material to be guided around the axis of the shafts SH–3 and SH–4, respectively, in a path corresponding to the path of the paper grippers. In this manner, the trailing edge of the sheet support material is guided by the paper guides in a path corresponding to the path of travel of the paper grippers about the shafts SH–3 and SH–4 at a lineal speed equal to the speed of travel of the paper grippers. The rise of the cord of the D-shaped paper guides and the delivery rolls is such that the cord surface of each guide 48A and delivery rolls 48 is positioned below the path of travel of the paper grippers, or stated in a different manner, the rise of the guides is slightly greater than the distance from the center line of the chain to the bottom of the paper grippers. The length of the chains and the spacing of the shafts SH–3 and SH–4 are so chosen so as to permit the D-shaped paper guides 48A and delivery rolls 48 to be fixed on the shafts SH–3 and SH–4 for rotation therewith, so that the paper grippers as they approach the D-shaped paper guides will mate with the cord portion of these guides for corresponding movement of these elements.

Referring now to FIG. 14, a sheet of support material, such as paper, forwarded into the paper guide 39 by the action of separator roller 42 is slightly wrinkled as the separator roller continues to advance the sheet after its forward motion has been arrested by the gate 355. Thus, as a paper gripper advances over the guide, the gate 355 will be forced open as the paper gripper strikes it and at the same time the cam followers of the grippers will strike the cam 65, fastened to cam supports 387 adjustably secured to frame plates 10 and 11, to open the jaws of the paper gripper to receive the sheet from the paper guide 39. Because of the slight buckle in the sheet and because at this time the separating roller is still attempting to advance the sheet, the sheet as it unbuckles will be forced between the jaws of the paper gripper so that as the cam followers of the grippers slide off the cams the jaws will close by the biasing action of the springs 399 to grip the sheet and forward it to the delivery station of the machine.

At the delivery station, the paper gripper passes between the delivery rollers 47 and 48 and as it does so, the grippers are again actuated by means of their cam followers riding over the cam 64 secured to the shoulder portions of the left-hand and right-hand conveyor supports, thereby releasing the sheet from the paper gripper for discharge to the return tray 3 by the delivery rollers. As the sheet is advanced between delivery rollers 47 and 48, it is guided by means of guide 52 secured to the left-hand and right-hand supports and by means of the previously described guide plate 307 on paper tray 41 to the collecting tray 3.

*Machine Operation*

The xerographic drum 20, copy drum 22 and sheet conveyor 43 are driven by a main drive motor MOT–3, as previously described. The conveyor and the toner dispenser are suitably driven by a motor MOT–4, not shown except schematically in FIG. 22. Suitable blowers, not shown, driven by motors MOT–2 and MOT–1 are used to dissipate heat generated by the fuser and projection lamps from the machine.

The cleaner roll 57 of the web cleaner is driven off the drum shaft SH–1 through a suitable gear train consisting of gear 427 fixed on shaft SH–1, gears 428 and 429 fixed on shaft 13, gears 431 and 432 fixed on shaft SH–14, gears 433 and 434 fixed on shaft SH–15, and gear 404 fixed on shaft SH–16, which supports the web cleaner roll 57. The rewind roll 61, supported on shaft SH–17, is driven by belt 442 riding on shaft SH–17 and on pulley 443 secured to shaft SH–15. Tension is maintained on the belt 442 so that it slips slightly on the shaft SH–17, by means of an idler 444 rotatably mounted on shaft SH–18. Each of the above-described shafts are suitably journaled in frame plate 11.

In the average office it is generally necessary to make, at random intervals throughout the day, a single reproduction from a single copy, multiple reproductions from a single copy or single reproductions from successive copies. For this reason, it is desirable to maintain the reproducing cycle in a standby operative condition with the reproduction cycle initiated only as desired.

Figure 22:
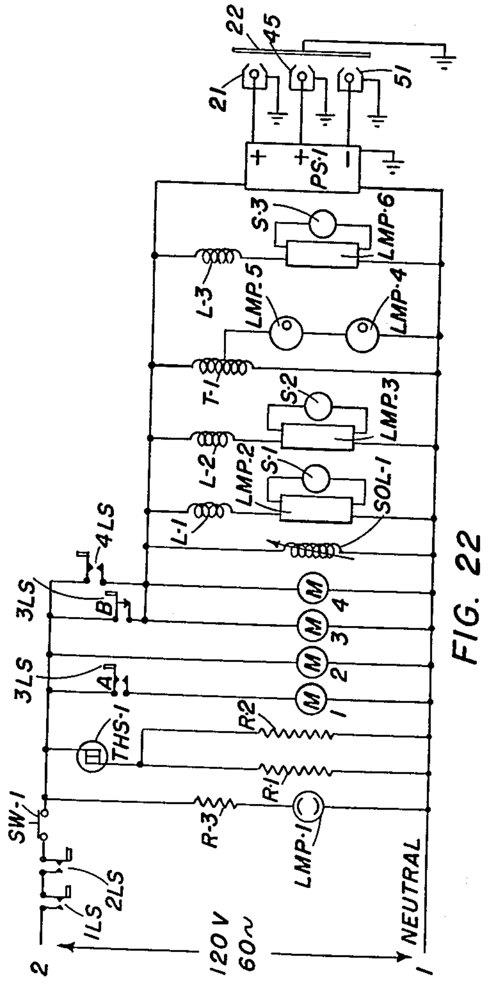

In the preferred embodiment of the invention, the control of the apparatus is affected by means of an electromechanical control apparatus, by means of which the operator can effect the desired sequence of operation. A control knob 6 secured to the control shaft 601 slidably supported in brackets 602 and 603 secured to frame plate 11 is used to control the operation of the machine. As an operator pushes the control knob and therefore the control shaft 601 attached thereto, a control lever 604 rotatably mounted on rod 605, fixed to frame plates 11 and 12, is pivoted in a counterclockwise direction, as seen in FIG. 22 to depress actuator 606 secured to a latch 607 rotatably mounted on latch rod 608 secured to frame plates 11 and 12. Latch 607 has an upturned finger portion engageable with time delay cam 611 and a depending finger portion engageable with the step portion cam lever 612 rotatably supported on rod 613 also secured to frame plates 11 and 12. The cam lever is secured at one end by means of a ball joint 614 to the torque tube lever 335 for actuation of the paper feed mechanism as previously described. Mounted near the opposite ends of the cam lever from the ball joint is a cam follower 615 suitably secured to the cam lever which is adapted to ride on the paper feed cam 616 fixed on drum shaft SH–1. The drum shaft SH–1, previously described, is held in axial alignment by means of a collar 617 secured to the shaft and riding against a thrust bearing 618 positioned adjacent to the flanged bearing 75 on frame plate 11, and by means of pulley 621, secured to the sprocket 125 fixed on the shaft, abutting against the flanged bearing 75 in frame plate 12. Shaft SH–1 is operatively connected to shaft SH–11 to drive this shaft by means of belt 622 riding on pulleys 621 and 623 fixedly mounted on shafts SH–1 and SH–11, respectively.

The time delay cam 611 is mounted on shaft 11 for either rotational or axial movement thereon, and is in effect part of a slip clutch arrangement by means of which the timing sequence of the apparatus may be controlled. The time delay cam 611 is provided on one face thereof with a cork clutch face 624 suitably secured thereon and positioned to engage the clutch element 625 suitably connected to shaft SH–11 by pin 626 for rotation therewith. The coil spring 627 encircling shaft SH–11, with one end of the spring abutting against pulley 623 and its other end abutting a spring seat 631 separated from the time delay cam 611 by means of bearing 632, is used to bias the time delay cam into frictional driven contact with the clutch element 625. It is realized that the force of the coil spring 627 should be sufficient to permit driving contact between the clutch face and the time delay cam but light enough to permit relative rotational movement between these two elements.

On the other face of the time delay cam 611 there is provided a cam riser 633 positioned to contact a normally closed limit switch 3LS mounted on bracket 634 secured to frame plate 12. As described in detail hereinafter limit switch 3LS and normally open limit switch 4LS suitably secured to frame plate 11 for actuation by the depending leg of latch 607 are used to control the operation of the machine.

Figures 18, 19, 20, 21:
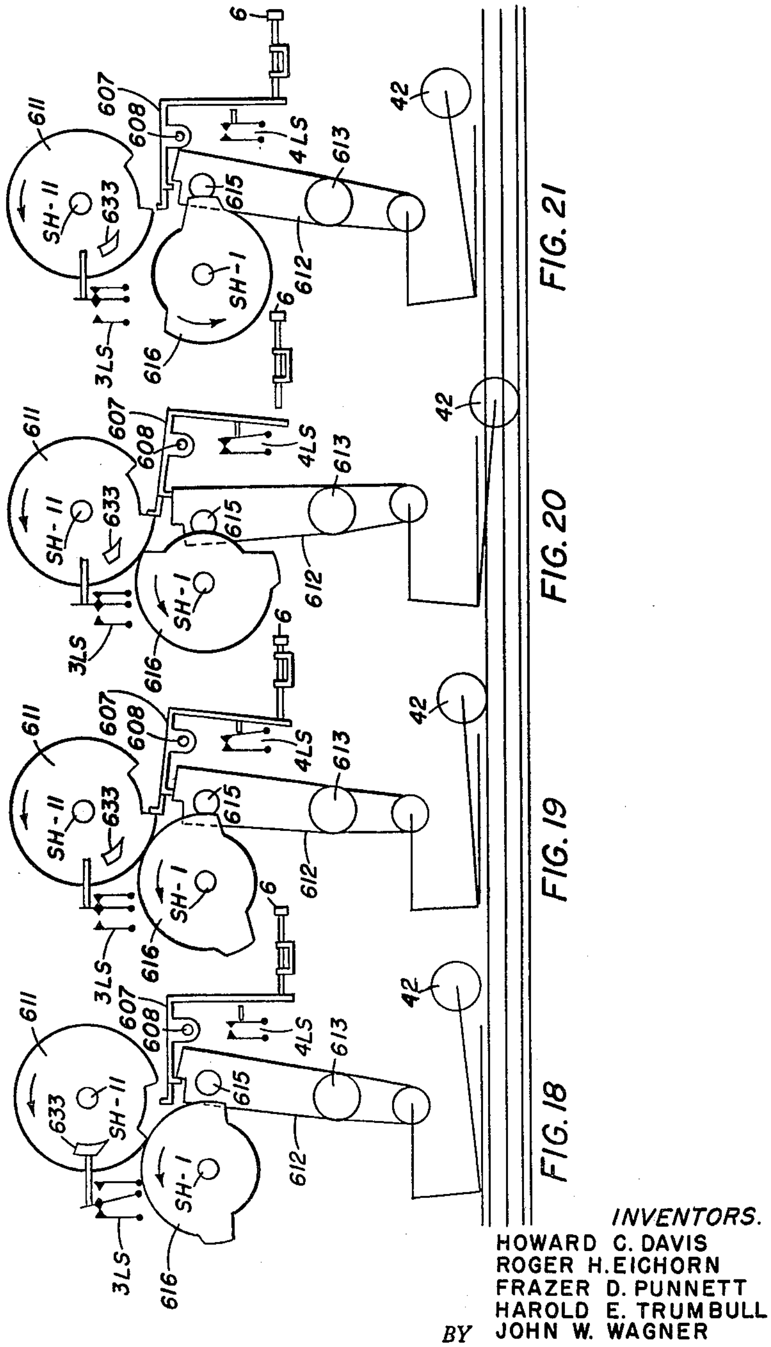
FIGS. 18, 19, 20 and 21 are schematic illustrations of the control mechanism of the apparatus showing the sequence of operation of these elements; and, FIG. 22 is a schematic electrical circuit wiring diagram of the apparatus.

FIG. 18 illustrates the relative position of time delay cam 611, and paper feed cam 616, at rest in position to initiate a reproducing cycle. The cam lever is disengaged from the paper feed cam and is held in this position by the depending portion of latch 607, engaging the stepped portion of the cam lever. The cam lever in this position holds the separating roll 42 off the stack of support material in the paper tray.

As the operator pushes or depresses the control knob 6 to initiate a reproducing cycle, the latch 607 is moved by actuator lever 604 and control shaft 601, to release the cam lever 612 to let the cam follower 615 thereon to ride against the paper control cam 616 and in this position the cam lever will permit the separator roller 42 to drop into a standby position to feed a sheet of paper from the paper tray. The cam lever is thus moved to the position shown in FIG. 19 as it is released by the latch 607 by the weight of the separator roller 42, and arms 322 and other associated elements of the paper feed system.

At the same time, the depending leg of the latch 607 is moved to actuate the limit switch 4LS and the upturned portion of the latch is moved up into the recessed portion of the time delay cam in position to accept this cam as it is rotated. In this angular position of the time delay cam the cam riser 633 thereon is positioned to actuate the limit switch 3LS whereby its normally closed contact 3LSB is open and its contact 3LSA is closed.

With the cam lever thus moved into the position shown in FIG. 19 the latch will remain in position to close the contact of limit switch 4LS, and its upturned portion is in position to stop the rotational movement of the time delay cam. When this occurs, the operator is free to release the control knob 6, which is then biased outward by spring 635 encircling the control shaft 601. One end of the spring 635 abuts against a leg of the U-shaped bracket 602 and its other end abuts against a control detent 636 fixed to the control shaft. The control detent is adapted to mate with suitable notches provided in the detent control seat 637 secured to the other leg of the bracket 602. However, when it is desired to maintain the control knob depressed for a purpose described hereinafter, the control knob when it is depressed is rotated by the operator to thereby rotate the control detent 636 out of mating relation with the control detent seat 637.

As the limit switch 4LS is actuated to close its contact, a circuit is completed to the main drive motor MOT–3 thereby energizing this motor to effect rotation of the time delay cam 611 and the paper feed cam 616. As the time delay cam 611 is rotated the latch 607 becomes engaged with it to stop its rotation movement, this being made possible through the clutch mechanism previously described. As the time delay cam 611 is rotated to the position shown in FIG. 19, its cam riser 633 rides off the actuator of the limit switch 3LS to open its contact 3LSA and to close its contact 3LSB operating in parallel with limit switch 4LS as described in detail hereinafter.

In the meantime, the paper feed cam 616 continues to rotate and as the fall of this cam communicates its movement to the cam follower 615 on cam lever 612, the cam lever will be rotated sufficiently to drop the separator roll 42 onto the stop sheet of the stack of support material. At the same time, the separator roll 42 is rapidly rotated by means of the segmental index lock 337 and actuating gear 336, through the drive system previously described, to feed the topmost sheet of support material into the guide 39 to be advanced to the sheet conveyor mechanism.

Further rotation of the paper feed cam 616 will bring the rise of this cam into contact with the follower 615 to actuate the cam lever 612 to lift the separator roll 42 from the stack through the mechanism previously described and at the same time it allows the latch to fall out of engaging relation with the time delay cam and to release limit switch 4LS to thereby permit its contact to open. Time delay cam 611 is now free to be rotated by the clutch mechanism and it will continue to rotate until the cam riser 633 thereon is again in position to again actuate limit switch 3LS to open its contact 3LSB to de-energize the circuit to the main drive motor.

This sequence of operation is for a single copy; however, the operator can effect repetitive cycles of the sequence of operation by merely depressing the control knob and rotating it to lift the control detent out of the control detent seat to thereby retain the latch in the position shown in FIG. 19 to maintain the contact of limit switch 4LS closed and to prevent the time delay cam 611 from rotating to effect a shutdown of the machine.

If the operator desires to make successive reproductions from successive originals, the operator as he depresses the control knob 6, will rotate it counterclockwise as seen in FIG. 9 to thereby permit the interposer to remain in position to effect operation of the gripper fingers 132 on the copy drum 22, whereby a copy may be accepted by the copy drum and ejected by the copy drum once every cycle of rotation of the copy drum in the manner previously described. However, if the operator wishes to make multiple reproductions of a single copy the control knob is turned clockwise as seen in FIG. 9 to thereby oscillate the actuator lever 161 about the axis of pin 162 by means of the cam 164 on the control shaft 601 to withdraw the interposer shaft out of interference relation with the lever 137A on the rock shaft 133 of the copy drum.

A clearer understanding of this operation and the general operation of the apparatus can best be obtained by reference to the schematic wiring diagram and by reference back to the sequence of operation diagram, FIGS. 18 to 21, inclusive, just described.

Before the xerographic apparatus may be actuated the removable sides of the cabinet must be placed in position to actuate the interlock switches 1LS and 2LS mounted on the cabinet frame, not shown. These interlock switches are used so that the machine may be operated only when the removable sides of the cabinet are in position. This provision is made, not only from the standpoint of safety, but also to insure proper air circulation within the cabinet to dissipate heat generated by the projection lamps and the heat fuser.

The entire assembly of the apparatus is energized by closure of switch SW–1 connecting the assembly through the interlock switches 1LS and 2LS to a suitable source of power, such as a commercial 120 volts 60 cycle alternating current outlet. With the closure of switch SW–1, a standby lamp LMP–1 is energized through resistor R–3, and the motor MOT–2 of one of the blowers is energized to dissipate heat generated by the fuser. The resistance heater elements R–1 and R–2 of the heat fuser 46 are energized through the normally closed thermostat THS–1. The machine is not operated for a short period of time to permit the heat fuser to come up to its normal operating temperature.

At the start of the sequence of operation as shown in FIG. 18 the time delay cam is in position whereat its cam riser 633 actuates limit switch 3LS to open its normally closed contact 3LSB and to close its contact 3LSA to thereby energize the blower motor MOT–1. These elements will remain energized and the machine will remain in this standby condition until either switch SW–1 is opened or until the machine is actuated to perform a reproducing cycle.

To make a reproduction, a copy is inserted into the machine over guide or document shelf 2 and through guide 31 into contact with the copy drum 22. The copy is advanced through guide 31 until its forward progress is stopped by the document stops 101 and in this position the document is maintained against the peripheral surface of the copy drum by retaining clips 109 whereby the operator can release the copy. The operator then depresses the control knob 6, and rotates it if desired to make either successive or multiple copies. As the control is depressed the latch 607 is moved to actuate limit switch 4LS to thereby close its contact to complete a circuit to the remaining electrical elements of the machine. That is, at this time the main drive motor MOT–3 is energized to rotate the xerographic drum 20, the copy drum 22 and the sheet conveyor mechanism 43, and to effect operation of the time delay cam 611 and the paper feed cam 616 through the mechanism previously described. Motor MOT–4 is also energized to effect operation of the developer mechanism 35 and toner dispenser 37. Solenoid SOL–1 is energized to open the gate 65 of the heat fuser 46. At the exposure station the exposure lamps are energized; that is, fluorescent lamps LMP–2 and LMP–3 are energized through their conventional starting circuits, consisting of ballast L–1 and L–2 and starter S–1 and S–2, respectively. Lamps LMP–4 and LMP–5 connected in series with each other are energized through the conductor line connected to the secondary of transformer T–1 also energized at this time. The discharge lamp LMP–6, a fluorescent lamp, is energized through its circuit consisting of ballast L–3 and starter switch S–3. Power is also supplied to the high voltage power supply PS–1 to effect operation of the corona charging device 21, the corona transfer device 45 and the corona pre-cleaning device 51.

As previously described, the latch 607 will remain in position to close the contact of limit switch 4LS for a period of time during the sequence of operation of the machine to enable the time delay cam to rotate sufficiently to release the limit switch 3LS whereby its contact 3LSA is opened and its normally closed contact 3LSB is opened and its normally closed contact 3LSB is again closed. Thus, when limit switch 4LS is opened by the release of latch 607, as shown in FIG. 21, the machine remains energized through the normally closed contact 3LSB of limit switch 3LS.

Now as the xerographic drum 20 rotates under corona charging device 21 a uniform electrostatic charge is deposited on the photoconductive layer of the drum. As the xerographic drum rotates through the exposure station, a light or radiation pattern of the copy carried on the rotating copy drum 22 is projected, by means of the mirror and lens assembly previously described, onto the surface of the drum to dissipate the charge on the drum in accordance with the light or radiation pattern of the copy, thereby forming a latent electrostatic image of the copy on said xerographic drum. The exposed portion of the drum then rotates to the developing station C, where a xerographic developing material including toner particles having an electrostatic charge are cascaded over the drum surface whereby the toner particles adhere to the electrostatic latent image to form a xerographic powder image in the configuration of the copy. The exposed and developed portion of the xerographic drum then passes to the image transfer station D where it receives a sheet of support material advanced by the separator roll 42 and transported into contact with the drum by the sheet conveyor. As the drum and sheet of support material pass over the corona transfer device 45 the developed powder image is transferred electrostatically to the sheet of support material. The xerographic drum then continues to rotate past the pre-cleaning corona device 51 and then to the web cleaning device whereat any residual powder on the drum surface is removed by the web, and then under the discharge lamp whereat any residual charge on the drum is dissipated by radiation from this lamp. In the meantime the copy drum has rotated at a corresponding rate of speed whereby it may have rejected any copy, if the interposer is in position to cause the ejection of copy, and the copy drum is then ready to receive a second copy, or if the copy is to be retained on the copy drum it is ready to be advanced through the exposure station again. Assuming that only a single reproduction of a single copy is being made, the copy will have been ejected from the machine and the xerographic powder image will have been transferred to the sheet of support material during the one cycle of rotation of the xerographic drum and copy drum. However, at this point in the operation of the apparatus, the sheet of support material with the powder image transferred thereto has not been ejected from the machine.

The operating cycle of the apparatus disclosed is such that it requires three cycles of rotation of the xerographic drum and the copy drum to effect one and one-half cycles of rotation of the sheet conveyor mechanism. In the embodiment of the apparatus shown, the pitch length of the chain of the sheet conveyor is twice the circumference of the xerographic drum, so for three revolutions of the xerographic drum the chain makes one and one-half revolutions. Thus, after the transfer step, even though a second reproduction is not to be made, the xerographic drum and the copy drum must rotate through a second and third revolution to permit the sheet conveyor mechanism to eject a sheet of support material from the machine. However, during the second and third revolution of the xerographic drum and the copy drum, still assuming that only a single reproduction is being made, the optical system will in effect scan a blank copy drum and project radiation from the copy drum onto the xerographic drum, to expose the xerographic drum to this blank image. The xerographic drum will then again pass through the developing station and through the transfer station as previously described; however, the latch 607, as seen in FIG. 21, has now engaged the cam lever 612 to prevent the advancement of a sheet of transfer material from the paper tray to the xerographic drum. As the xerographic drum continues to rotate through the second and third cycle it will again be cleaned as it passes through the cleaning station E and thus made ready for an actual reproducing cycle.

The continued operation of the sheet conveyor and therefore of necessity of the copy drum and xerographic drum, is effected by means of the time delay cam 611 which operates in time sequence to the rotation of the xerographic drum as driven by the chain conveyor mechanism so that sufficient time is allowed before the main drive motor is de-energized by opening of contact 3LSB to enable the sheet conveyor mechanism and the delivery rollers to eject the reproduction from the machine. The time delay cam completes one revolution, at half the speed of rotation of the xerographic drum, to bring its cam riser 633 into contact with the limit switch 3LS to open its normally closed contact 3LSB and to close contact 3LSA. As contact 3LSB is opened the developer motor MOT–4 is de-energized, and the main drive motor MOT–3 is de-energized to effect stoppage of the xerographic drum, the copy drum and the sheet conveyor mechanism. At the same time, solenoid SOL–1 is de-energized to allow the gate on the heat fuser to close and the document lamps LMP–2, LMP–3, LMP–4 and LMP–5 are de-energized as is the discharge lamp LMP–6. Simultaneously with the stoppage of the xerographic drum, the high voltage power supply 1 is de-energized thereby de-energizing the corona charging device 21, the corona transfer device 45 and the corona pre-cleaning device 51. The machine is once again in its standby condition, and a xerographic reproducing cycle can be initiated in the manner previously described, or the machine can be shut down by opening switch SW–1.

In making successive reproduction or multiple reproductions, a xerographic reproducing cycle is effected for each revolution of the xerographic drum except for the last reproduction to be made, at which time the machine effects one complete operating cycle, that is, three cycles of the xerographic drum and copy drum to one and one-half of the conveyor mechanism, exactly as described hereinabove for a single reproduction. In other words, in making successive or multiple reproductions, as the last reproduction is to be made, the operator will rotate control knob 6 into the single copy position, that is, where control detent 636 is in position to mate with detent control seat 637 at which time the operation of the machine is set for a single reproducing cycle.

While the invention has been described with reference to the structures disclosed herein it is not confined to the details set forth and this application is intended to cover such modifications or changes as may come within the purposes of the improvements or the scope of the following claims.

What is claimed is:

1. A document feed mechanism for conveying a document from a document feeding station through a copying station, the document feed mechanism including
a rotary cylinder,
document gripper means carried by said cylinder, said document gripper means including gripper fingers adapted to cooperate with the peripheral surface of said cylinder to engage the leading edge of a document,
spring means attached to said cylinder and connected to said document sheet gripper means for normally biasing said gripper fingers into cooperating relationship with said cylinder,
means for rotating said cylinder in a path past a document feeding station and then a copying station,
means to hold and align a document tangentially to said cylinder, said means being located at said document feeding station adjacent said cylinder,
said means to hold and align a document including a rod positioned parallel to and adjacent said rotary cylinder supporting retaining means positioned to rest against said cylinder to yieldingly hold a document against said cylinder, and document stops, and biasing means connected to said document stops and said rod to normally bias said document stops against the peripheral surface of said cylinder;
and interposer means movably positioned adjacent said cylinder for movement from a first position in which said interposer means is in operative relationship to said document gripper means to actuate said document gripper means as it is advanced adjacent said means to hold and align a document during each rotation of said cylinder, and to a second position in which said interposer means is out of operative relation to said sheet gripper means.

2. A document feed mechanism for conveying a document from a document feeding station through a copying station, the document feed mechanism including
a rotary cylinder,
document gripper means carried by said cylinder,
said document gripper means including gripper fingers adapted to cooperate with the peripheral surface of said cylinder to engage the leading edge of a document,
spring means attached to said cylinder for normally biasing said gripper fingers into cooperating relationship with said cylinder,
means for rotating said cylinder in a path past a document feeding station and a copying station,
a document guide positioned adjacent said cylinder at said document feeding station,
a rod positioned parallel to the axis of said cylinder and adjacent said document guide,
retaining means mounted on said rod and positioned to rest against said cylinder to yieldingly hold a document inserted through said guide against said cylinder,
document stop means movably positioned on said rod, biasing means connected to said document stop means and to said rod to bias said document stop means against the peripheral surface of said cylinder to arrest and align the leading edge of a document thereon, said document gripper means actuating said document stop means during each revolution of said cylinder to release a document retained against said document stop means to said document gripper means, and interposer means positioned adjacent said cylinder for movement from a first position in which said interposer means is in operative relation to said document gripper means as it travels adjacent said document stops and to a second position in which said interposer means is out of operative relation to said document gripper means.

3. A document feed mechanism for conveying a document from a document feeding station through a copying station, the document feed mechanism including a rotary cylinder, document gripper means carried by said cylinder, said document gripper means including gripper fingers adapted to cooperate with the peripheral surface of said cylinder to engage the leading edge of a document, spring means attached to said cylinder for normally biasing said gripper fingers into cooperating relationship with said cylinder, means for rotating said cylinder in a path past a document feeding station and a copying station, a rod positioned parallel to the axis of said cylinder and adjacent said cylinder at said document feeding station, retaining means mounted on said rod and positioned to rest against said cylinder to yieldingly hold a document against said cylinder, document stop means loosely positioned on said rod, biasing means connected to said document stop means and to said rod to bias said document stop means against the peripheral surface of said cylinder to arrest and align the leading edge of a document thereon, said document gripper means actuating said document stop means during each revolution of said cylinder to release a document retained by said document stop means to said sheet gripper means, and interposer means positioned adjacent said cylinder for movement from a first position in which said interposer means is in operative relation to said document gripper means as it travels adjacent said document stops and to a second position in which said interposer means is out of operative relation to said document gripper means.

4. A document feed mechanism for conveying a document from a document feeding station through a copying station to a document release station, the document feed mechanism including a rotary cylinder document gripper means carried by said cylinder, said document gripper means including gripper fingers adapted to cooperate with the peripheral surface of said cylinder to engage the leading edge of a document, spring means attached to said cylinder for normally biasing said gripper fingers into cooperating relationship with said cylinder, means for rotating said cylinder and therefore said document gripper means in a path through said document feeding station, said copying station and said document release station, means to hold and align a sheet tangentially to said cylinder at said document feeding station, said means including a rod positioned parallel to the axis of said cylinder, retaining means mounted on said rod and positioned to rest against said cylinder to yieldingly hold a document against said cylinder, document stop means movably positioned on said rod, first spring means connected to said document stop means to bias said document stop means against the peripheral surface of said cylinder to arrest and align the leading edge of a document thereon, second spring means connected to said rod to yieldingly rotate said rod in a direction to yieldingly force said document stop means against the peripheral surface of said cylinder, said document gripper means rotating said rod during each revolution of said cylinder against the biasing action of said second spring means to release a document retained by said document stop means to said document gripper means, and interposer means positioned adjacent said cylinder for movement from a first position in which said interposer means is in operative relation to said document gripper means to actuate said document gripper means as it advances through said document release station and said document feeding station and to a second position in which said interposer means is out of operative relation to said sheet gripper means.

5. A document feed mechanism for conveying a document from a document feeding station through a copying station, the document feed mechanism including a copy cylinder journaled for rotation, document gripper means carried by said cylinder, said document gripper means including gripper fingers adapted to cooperate with the peripheral surface of said cylinder to engage the leading edge of a document, spring means attached to said cylinder for normally biasing said gripper fingers into cooperating relationship with said cylinder, drive means connected to said cylinder for rotating said cylinder in a path through a document feeding station and through a copying station, a rod rotatably positioned parallel to the axis of said cylinder at the document feeding station, retaining means loosely mounted on said rod and positioned to rest against said cylinder to yieldingly hold a document against said cylinder, blocks loosely journaled on said rod, a document stop positioned on each of said blocks, a torsion spring means connected to each of said blocks and to said rod to bias said document stops against the peripheral surface of said cylinder to arrest and hold the leading edge of a document thereon, said document gripper means actuating said document stops during each revolution of said cylinder to release a document retained by said document stops to said gripper fingers, and interposer means positioned adjacent said cylinder for movement from a first position in which said interposer means is in operative relation to actuate said document gripper means as it travels through the document feeding station and to a second position in which said interposer means is out of operative relation to said document gripper means as it travels through the document feeding station.

6. A document feed mechanism including a copy cylinder journaled for rotation, document gripper means carried by said cylinder, said document gripper means including gripper fingers adapted to cooperate with the peripheral surface of said cylinder to engage the leading edge of a document, spring means attached to said cylinder for normally biasing said gripper fingers into cooperating relationship with said cylinder, drive means connected to said cylinder for rotating said cylinder to move said sheet gripper means through a sheet receiving position, a rod rotatably mounted parallel to the axis of said cylinder, retaining means loosely mounted on said rod and positioned to rest against said cylinder to yieldingly hold a document against said cylinder at the sheet receiving station,
blocks loosely journaled on said rod,
document stops positioned on each of said blocks,
first spring means connected to said blocks and to said rod to bias said document stops against the peripheral surface of said cylinder to arrest and align the leading edge of a document thereon,
second spring means connected to said rod to yieldingly bias said rod in a direction to force said document stops against the peripheral surface of said cylinder,
said document gripper means actuating said document stops during each revolution of said cylinder,
and interposer means positioned adjacent said cylinder for movement from a first position in which said interposer means is in operative relation to said document gripper means as it travels adjacent said document stops and to a second position in which said interposer means is out of operative relation to said document gripper means.

7. A document feed mechanism including
a rotary cylinder,
document gripper means carried by said cylinder, said document gripper means including gripper fingers adapted to cooperate with the peripheral surface of said cylinder to engage the leading edge of a document,
spring means attached to said cylinder for normally biasing said gripper fingers into cooperating relationship with said cylinder,
means for rotating said cylinder to move said sheet gripper means through a sheet receiving position,
guide means to hold and align a sheet against said cylinder,
said guide means being located at said sheet receiving position adjacent said cylinder,
said guide means including a rod positioned adjacent the peripheral surface of said cylinder and parallel to the axis of rotation of said cylinder; retaining means mounted on said rod and positioned to rest against said cylinder to yieldingly hold a document against said cylinder,
document stops loosely mounted on said rod,
and biasing means connected to said rod and to said document stops to normally bias said document stops against a peripheral surface of said cylinder;

and interposer means movably positioned adjacent said cylinder for movement from a first position in which said interposer means is in operative relation to said document gripper means to actuate said document gripper means during each rotation of said cylinder to a second position in which said interposer means is in an inoperative relation to said sheet gripper means.

8. A document feed mechanism including
a cylinder journaled for rotation,
document gripper means carried by said cylinder,
said document gripper means including gripper fingers adapted to cooperate with the peripheral surface of said cylinder to engage the leading edge of a document,
spring means attached to said cylinder for normally biasing said gripper fingers into cooperating relation with said cylinder,
means for rotating said cylinder,
guide means to hold and align a sheet against said cylinder,
said guide means including a rod positioned parallel to the axis of said cylinder,
retaining means mounted on said rod and positioned to yieldingly hold a document,
document stop means positioned on said rod adjacent said cylinder,
biasing means connected to said rod and to said document stop means to bias said document stop means against the peripheral surface of said cylinder to arrest and align the leading edge of a document thereon,
said document gripper means actuating said document stop means during each revolution of said cylinder,
and means positioned adjacent said cylinder for actuating said document gripper means as it travels adjacent said document stops.

References Cited in the file of this patent

UNITED STATES PATENTS

| | | |
|---|---|---|
| 114,106 | Campbell | Apr. 25, 1871 |
| 487,254 | Cottrell | Dec. 6, 1892 |
| 1,159,011 | Garlick | Nov. 2, 1915 |
| 2,374,668 | Davidson | May 1, 1945 |
| 2,720,165 | Gullixson et al. | Oct. 11, 1955 |
| 2,855,996 | Stobb | Oct. 14, 1958 |